(12) United States Patent
Baker et al.

(10) Patent No.: US 11,590,880 B1
(45) Date of Patent: Feb. 28, 2023

(54) PREDICTIVE ILLUMINATION SHAPING

(71) Applicant: Rivian IP Holdings, LLC, Plymouth, MI (US)

(72) Inventors: Simon Baker, Hampshire (GB); Erik Humm, Dana Point, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 17/743,628

(22) Filed: May 13, 2022

(51) Int. Cl.
*B60Q 1/08* (2006.01)
*B60Q 1/14* (2006.01)

(52) U.S. Cl.
CPC ............. *B60Q 1/085* (2013.01); *B60Q 1/143* (2013.01); *B60Q 2300/42* (2013.01)

(58) Field of Classification Search
CPC ................ B60Q 1/085; B60Q 2300/32; B60Q 2300/322; B60Q 2300/324; B60Q 1/143
See application file for complete search history.

(56) References Cited

U.S. PATENT DOCUMENTS

| | | |
|---|---|---|
| 2017/0270375 A1 | 9/2017 | Grauer |
| 2018/0136644 A1 | 5/2018 | Levinson et al. |
| 2018/0340790 A1 | 11/2018 | Kislovskiy et al. |
| 2019/0276022 A1 | 9/2019 | Bae et al. |
| 2021/0033255 A1 | 2/2021 | Kuffner, Jr. |
| 2022/0108465 A1 | 4/2022 | Yang et al. |

OTHER PUBLICATIONS

Non-Final Office Action dated Aug. 11, 2022, for U.S. Appl. No. 17/743,609, filed May 13, 2022, nineteen pages.
Final Office Action dated Dec. 14, 2022, for U.S. Appl. No. 17/743,609, filed May 13, 2022, twenty two pages.

*Primary Examiner* — Robert J May
(74) *Attorney, Agent, or Firm* — Morrison & Foerster LLP

(57) ABSTRACT

Particular embodiments may provide for a method of providing illumination for a vehicle. A signal to activate a headlamp assembly for a vehicle may be sent. The headlamp assembly may comprise a laser-based lamp positioned to provide high-beam illumination, including a plurality of beam subfields, and a light sensor configured to capture images of illuminated objects, wherein the light sensor is capable of sensing objects illuminated by visible-spectrum light. A focal region for the high-beam illumination may be determined based on images captured by the light sensor. Instructions to configure the laser-based lamp to modify a distribution of the high-beam illumination to increase brightness of one or more beam subfields of the high-beam illumination within the focal region may be sent.

20 Claims, 20 Drawing Sheets

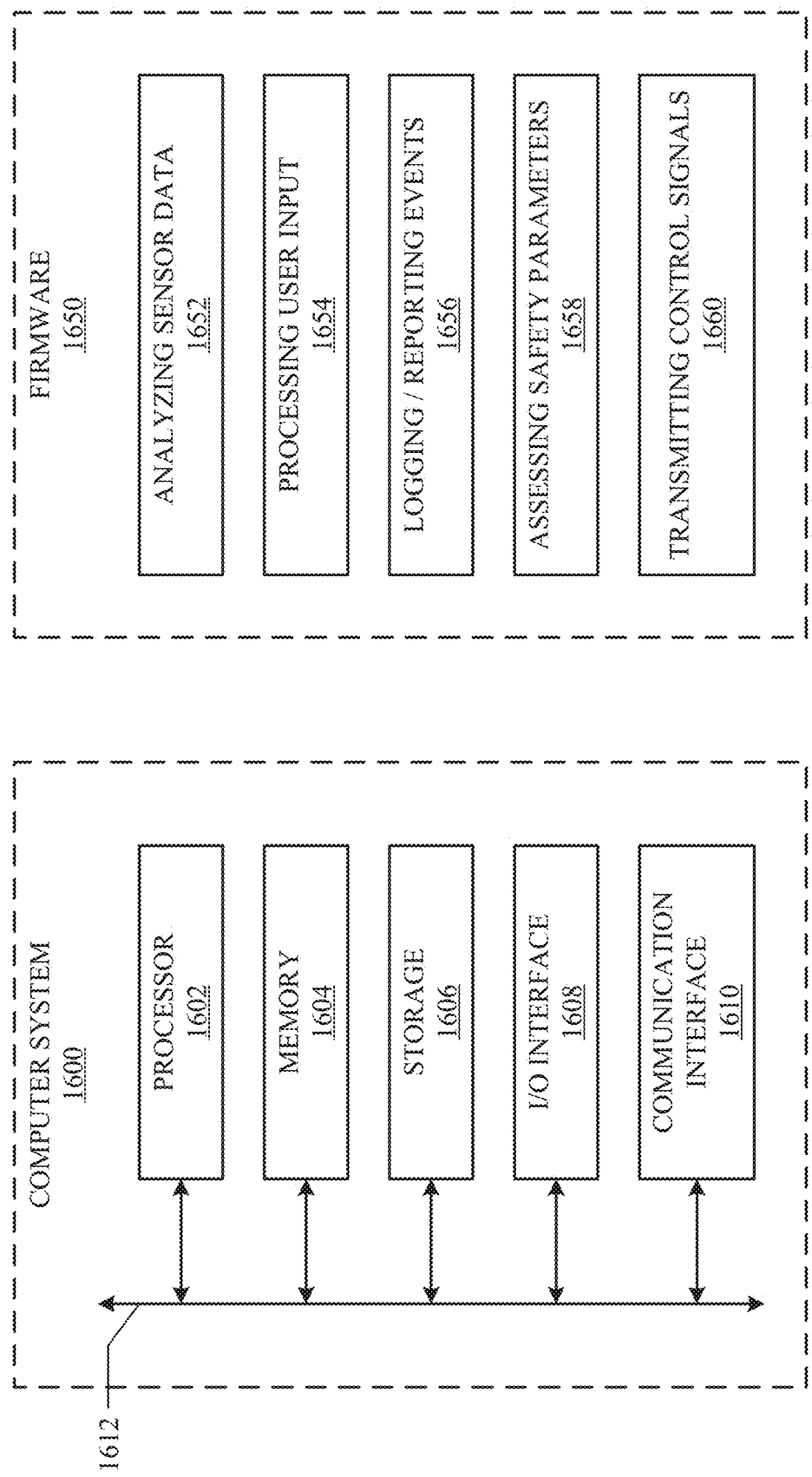

PREDICTIVE ILLUMINATION SHAPING

INTRODUCTION

Modern vehicles generally provide illumination by a combination of lights (e.g., low-beam lights, high-beam lights, and fog-lights) in fixed area in front of the vehicle. However, the fixed area in front of the vehicle may not adequately illuminate the area in the intended area of travel when the intended area of travel is not straight (e.g., corners and curves). Consequently, the driver's visibility of the road ahead and time to react to hazards may be diminished.

SUMMARY

In particular embodiments, a method may provide for illumination for a vehicle, where the illumination distribution may be modified through spatial beam shaping. For example, when a vehicle is approaching a curve in a road, the high-beam illumination distribution may be modified to increase brightness within a focal region which may be the intended direction of travel.

Artificial intelligence-based techniques (e.g., computer vision or machine-learning models) may be utilized to detect, identify, and assess the focal region. The focal region for the high-beam illumination may be determined based on images captured by the light sensor. The focal region for the high-beam illumination may be based on an identified curve in front of the vehicle. The curve may be determined based on road markings or road signs or a road surface. The focal region may also be determined based on a user input for controlling vehicle movement (e.g., steering, turn-signal activation, accelerating, or braking), a kinetic state (e.g., speed or acceleration) of the vehicle, or an upcoming change in direction of the vehicle based on information defining a route of travel (e.g., based on a calculated route from a user-inputted destination or based on mapping data related to the roadway the vehicle is currently traveling on).

When the brightness of the high-beam illumination increases within the focal region, the total energy consumption may remain constant (i.e., there may be no increase in energy consumption when the brightness within the focal region increases).

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 16A is a schematic of an example computer system.

FIG. 16B illustrates example firmware for a vehicle ECU.

DESCRIPTION OF EXAMPLE EMBODIMENTS

Figure 1A:
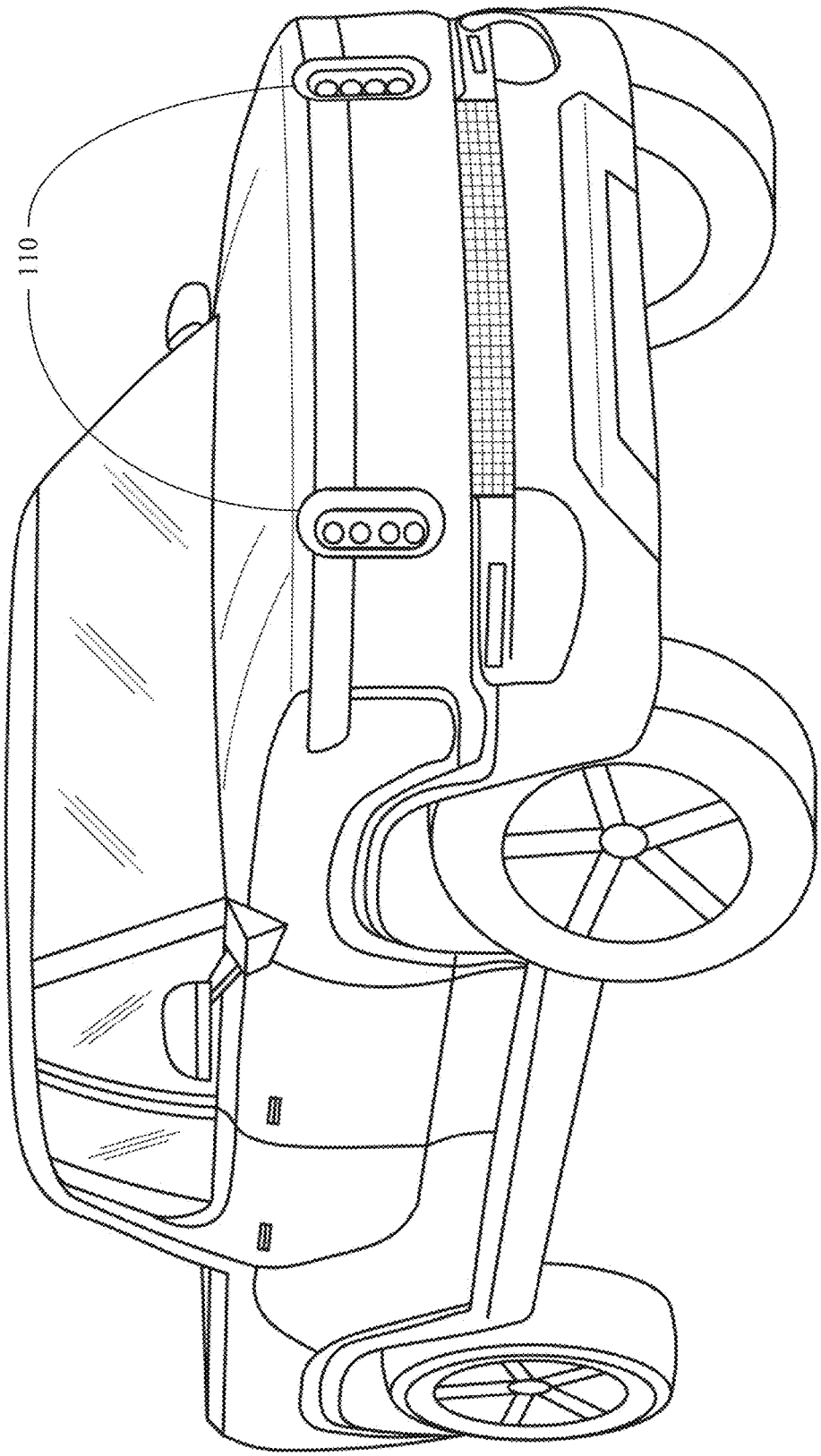
FIG. 1A illustrates an example four-lamp headlamp assembly integrated in a vehicle.

In particular embodiments, a method may provide illumination for a vehicle to illuminate and detect potential objects of interest. For example, a driver may be alerted to a detected illuminated object of interest from images of a scene illuminated and captured by the headlamp assembly. The headlamp assembly may illuminate the scene by a laser-based white light lamp or a laser-based infrared lamp and may capture images of the illuminated scene by a light sensor.

Artificial intelligence-based techniques (e.g., computer vision or machine-learning models) may be utilized to detect, identify, and assess the illuminated objects. For example, the detecting the object of interest may include segmenting the captured images to locate boundaries of the illuminated objects in the images of the scene. The detected object may be classified as an object of interest based on features of the illuminated objects in the images of the scene. From the features of the illuminated objects in the images of the scene, a level of risk of impact may be determined for each of the objects in the scene. Based on the detection of the objects of interest, an alert may be provided. The alert may also be based on the risk of impact determined for each of the objects in the scene.

In particular embodiments, a method may provide selective high-beam illumination for a vehicle. For example, if a traveling vehicle is within the beam field of the high-beam illumination from a laser-based lamp of the primary vehicle, the high-beam illumination may dim light output towards the other vehicle to minimize negatively affecting the driver of the other vehicle.

In response to receiving user-input about controlling a headlamp assembly, artificial intelligence-based techniques (e.g., computer vision or machine-learning models) may be utilized to detect, identify, and assess illuminated objects. For example, the detecting the object of interest may comprise segmenting the captured images to locate boundaries of the illuminated objects in the images of the scene. The detected object may be classified as an object of interest based on features of the illuminated objects in the images of the scene. From the features of the illuminated objects in the images of the scene, each of the objects in the scene may be determined as a traveling vehicle.

In particular embodiments, a method may provide for illumination for a vehicle, where the illumination distribution may be modified for spatial beam shaping. For example, when a vehicle is approaching a curve in a road, the high-beam illumination distribution may be modified to increase brightness of one or more beam subfields of the high-beam illumination within a focal region which may be the intended direction of travel.

Artificial intelligence-based techniques (e.g., computer vision or machine-learning models) may be utilized to detect, identify, and assess the focal region. The focal region for the high-beam illumination may be determined based on images captured by the light sensor. The focal region for the high-beam illumination may be based on an identified curve in front of the vehicle. The curve may be determined based on road markings or road signs or a road surface. The focal region may also be determined based on a user input for controlling vehicle movement (e.g., steering, turn-signal activation, accelerating, or braking), a kinetic state (e.g., speed or acceleration) of the vehicle, or an upcoming change in direction of the vehicle based on information defining a route of travel (e.g., based on a calculated route from a user-inputted destination or based on mapping data related to the roadway the vehicle is currently traveling on).

When the brightness of the one or more beam subfields of the high-beam illumination increases within the focal region, the total energy consumption may remain constant (i.e., there may be no increase in energy consumption when the brightness within the focal region increases).

FIG. 1A illustrates an example four-lamp headlamp assembly 110 integrated in vehicle 100. In particular embodiments, four-lamp headlamp assembly 110 may be positioned at the front of vehicle 100A. As an example and not by way of limitation, four-lamp headlamp assembly 110 may be positioned at the position of a traditional headlamp assembly.

Figure 1B:
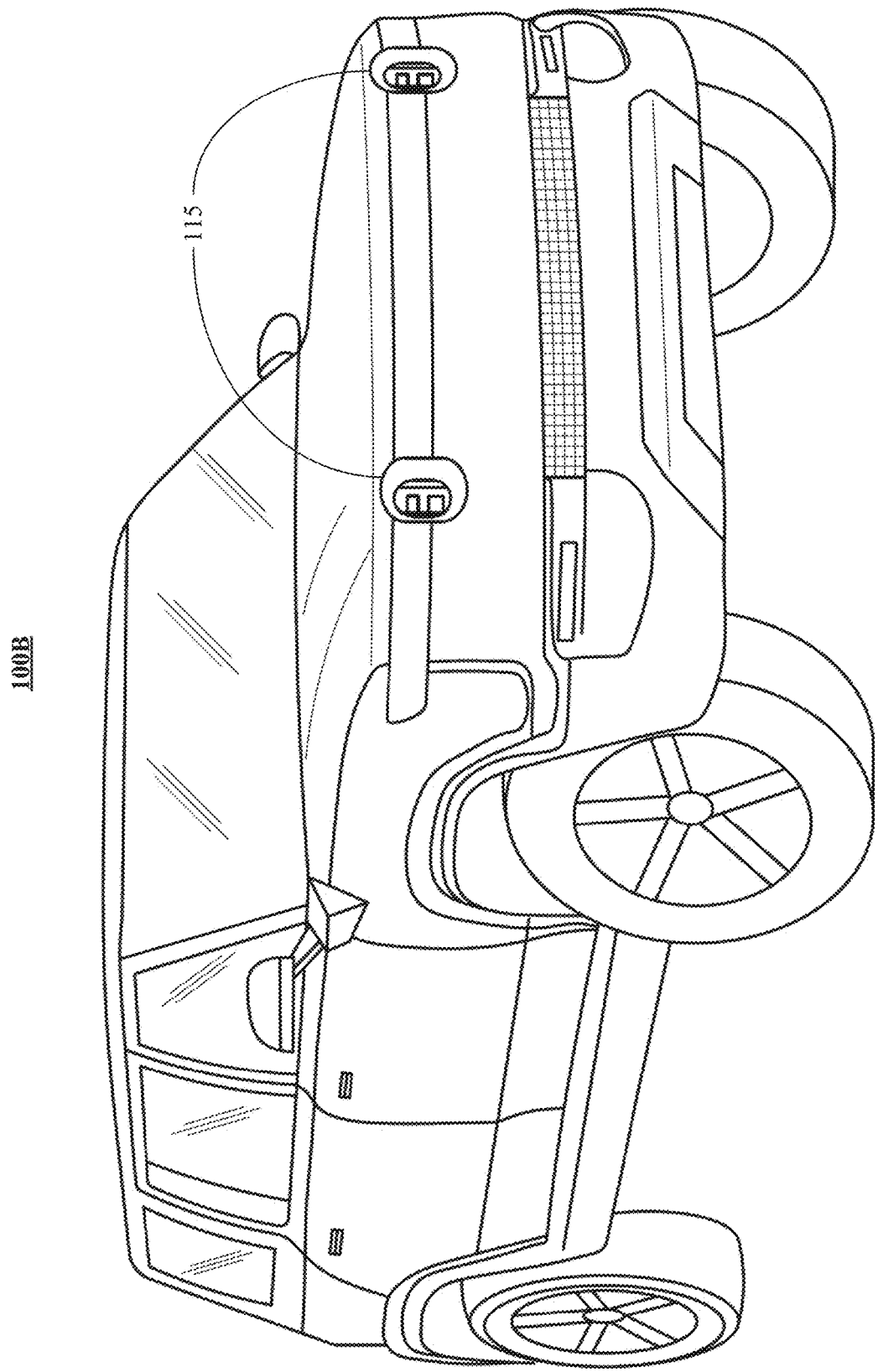
FIG. 1B illustrates an example two-lamp headlamp configuration integrated in a vehicle.

FIG. 1B illustrates an example two-lamp headlamp assembly 115 integrated in vehicle 105. In particular embodiments, two-lamp headlamp assembly 116 may be positioned at the front of vehicle 105. As an example and not by way of limitation, two-lamp headlamp assembly 115 may be positioned at the position of a traditional headlamp assembly. Two-lamp headlamp assembly 115 may be smaller than four-lamp headlamp assembly 110 or the traditional headlamp assembly.

Figure 2:
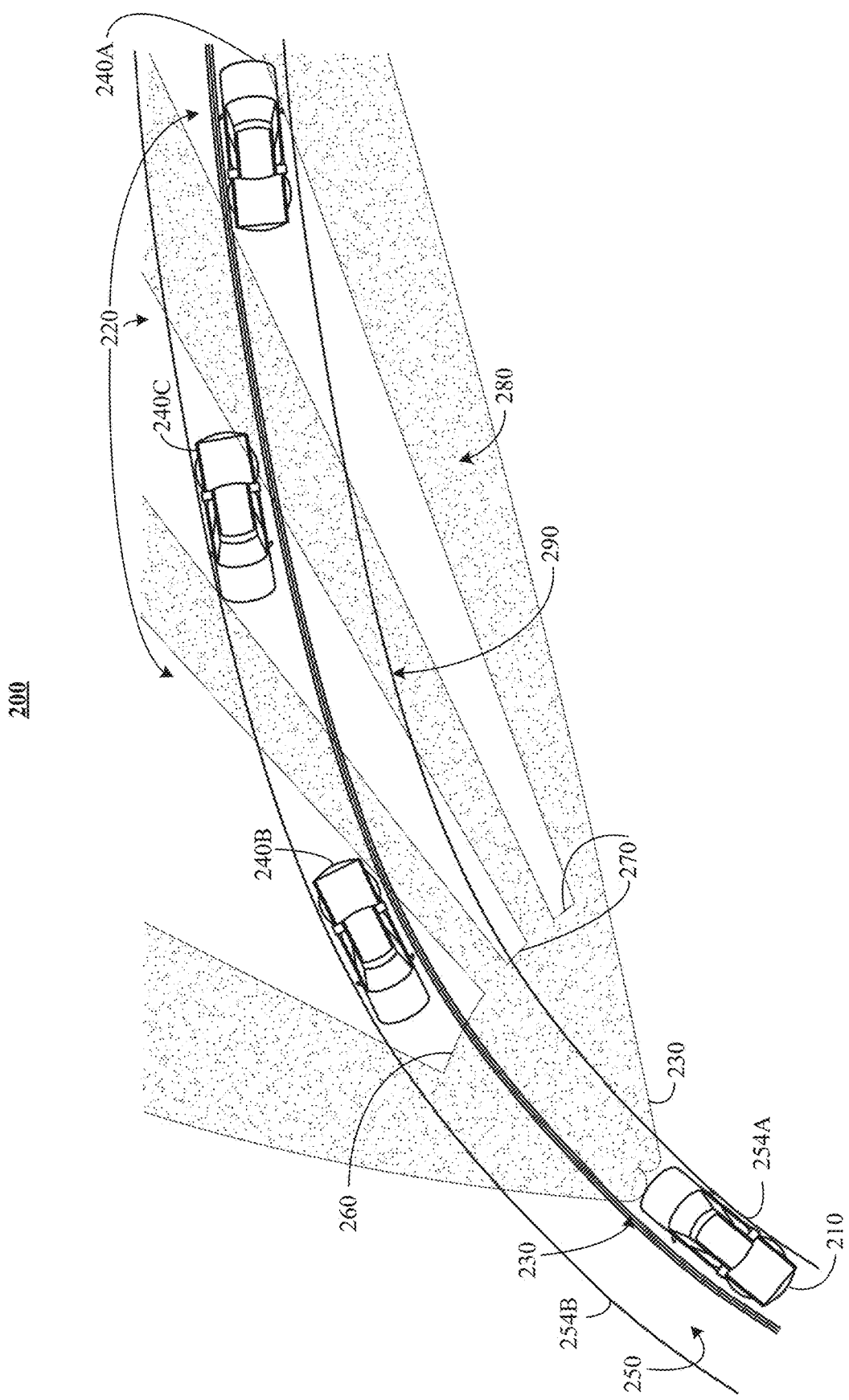
FIG. 2 illustrates an example of dimming light within a beam subfield of a beam field and increasing brightness within a prescribed focal region.

FIG. 2 illustrates an example variable illumination pattern 200 of vehicle 210. The variable illumination pattern 200 may be dimming light within beam subfields 220 of beam field 230 from headlamp assemblies 235. Beam field 230 may include a plurality of beam subfields 220. One or more images of the scene illuminated by the headlamp assembly 235 may be captured by a light sensor. Headlamp assembly 235 may include a laser-based lamp positioned to provide high-beam illumination in the form of broad-spectrum, incoherent white light. The light sensor may be capable of capturing images in the visible spectrum or in the infrared spectrum. The captured images may be segmented to locate boundaries of illuminated objects in images of the scene. The object of interest in the images of the scene may be detected. The detected objects may be identified as traveling vehicle 240A-C moving along a path in beam field 23. The detected objects may be identified as traveling vehicle 240A-C based on features of the illuminated objects in the images of the scene. Traveling vehicle 240A-C may be determined as same-direction traveling vehicle 240A or opposite-direction traveling vehicles 240B-C.

The features for each illuminated object may comprise a shape of illuminated object based on the boundaries, a classification of illuminated object as stationary or moving, or a kinematics assessment for illuminated object. The shape of the illuminated object may be used to determine the illuminated object as a vehicle. The vehicle captured in the images of the scene may be at any angle relative to vehicle 210. For example, the vehicle captured in the images of the scene may be same-direction traveling vehicle 240A, opposite-direction traveling vehicles 240B-C, or may be a vehicle crossing in front of vehicle 210 at an intersection.

The classification of the illuminated object as stationary or moving may be used to determine illuminated object as traveling vehicle. The classification of illuminated object as stationary or moving may be based the captured images of the scene. For example, if the illuminated object changes position relative to the scene, the illuminated object may be classified as a moving vehicle. A moving vehicle may be classified as traveling vehicles 240A-C, but a stationary vehicle may not be classified as traveling vehicles 240A-C. The traveling vehicle may be further classified as an approaching or a departing vehicle based on the captured images of the scene. For example, the traveling vehicle increasing in size in subsequent captured images of the scene may be classified as an approaching vehicle and the traveling vehicle decreasing in size in subsequent captured images of the scene may be classified as a departing vehicle.

The kinematics assessment for illuminated object may be a calculated acceleration of the illuminated object, a calculated velocity of the illuminated object, a calculated relative velocity between the illuminated object and vehicle 210, or a predicted trajectory of the illuminated object. The kinematics assessment of the illuminated object may also be used to determine the path of same-direction traveling vehicle 240A or opposite-direction traveling vehicles 240B-C.

In particular embodiments, same-direction traveling vehicle 240A may be classified as traveling in the same direction as vehicle 210 and opposite-direction vehicles 240B-C may be classified as traveling in the opposite direction as vehicle 210 based on features of the traveling vehicle.

In some embodiments, beam subfields 220 may be dimmed for traveling vehicles 240A-C. Beam Subfields 220 may also dim for users on a wheel based mode of transportation (e.g., bicycles, scooters, or longboards). When and where beam subfields 220 are dimmed may be based on the path of traveling vehicles 240A-C. One or more beam subfields 220 may be dimmed at simultaneously. The number of beam subfields 220 dimmed may correlate with the number of traveling vehicles 240A. A size and shape of beam subfield 220 may correspond to a size and shape of the traveling vehicle. The size and shape of beam subfields 220 may also correspond to an area to minimize high-beam illumination glare to the driver of traveling vehicles 240A-C. The high-beam illumination glare may comprise direct light or indirect light (e.g., reflected from a mirror or other reflective surface) from headlamp assembly 235. Beam subfields 220 may also be at maximum brightness until reaching traveling vehicle boundary 260 or until threshold distance 270. Beam subfield 220 may be based on the predicted trajectory of the traveling vehicle. Beam subfield 220 may further be based on when the traveling vehicle will intersect beam field 230 or subfield 220.

The dimming of beam subfield 220 may be based on the direction of travel of traveling vehicles 240A-C. The amount of dimming of the light output within a beam subfield can vary from 0% dimming (e.g., full brightness) to 100% dimming (e.g., turned off). The dimming of beam subfield 220 may be greater in a subarea within the field of vision of a driver of traveling vehicle 240A-C than the rest of beam subfield 220 outside the driver's field of vision. The differential in dimming may reduce the glare experienced by the driver of the traveling vehicle while illuminating traveling vehicle 240A-C for the driver of the primary vehicle.

In particular embodiments, the detection of traveling vehicles 240A-C may be based on roadway 250. Roadway 250 may comprise center line 252, same-direction shoulder line 254A, and opposite-direction shoulder line 254B. Traveling vehicles 240A-C may be determined as a same-direction traveling vehicle 240A when the traveling vehicle is between center line 252 and the same-direction shoulder line 254A. Traveling vehicles 240A-C may be determined as a same-direction traveling vehicle 240B-C when the traveling vehicle is between center line 252 and the same-direction shoulder line 254B.

In particular embodiments, variable illumination pattern 200 may be increasing brightness within prescribed focal region 280. Focal region 280 may be a direction of intended travel of vehicle 210. Focal region 280 may also be an inside corner of a curve on roadway 250. Foal region 280 may also comprise one or more corners of an intersection. Focal region 280 may be based on a speed or acceleration of vehicle 210. Focal region 280 may be a region without traveling vehicles 240A-C.

In particular embodiments, focal region 280 may be determined based on curve 290 in front of vehicle 210. The road markings, such as center line 252 or shoulder lines 254A-B, or road signs in front of the vehicle may be used to determine curve 290 in front of vehicle 210. The curve may be determined based on a path, radius, or slope of curve 290. The path, radius, or slope of curve 290 may be determined based on the road markings or road signs in front of vehicle 210.

Curve 290 may also be determined based on a road surface of roadway 250 in front of vehicle 210. The road surface may comprise a constructed road surface or a natural surface compacted by regular travel.

Focal region 280 may be determined based on a predicted trajectory. The predicted trajectory may be based on detecting a user-input for controlling vehicle movement (e.g., a steering angle, a turn signal activation, or a throttle input or a brake input). The focal region may be determined based on the amount of steering angle inputted by the user. For example, a slight steering input (e.g., making a shallow turn) by the user may result in increased brightness of the focal region where the focal region is slightly off from center in the direction of the steering input, while a large steering input (e.g., making a sharp turn or U-turn) may result in the focal region being more deflected from center in the direction of the steering input. The turn signal activation may be used to determine the left or right direction of curve 290. Focal region 280 may also be determined based on a kinetic state of the vehicle. The kinetic state of the vehicle may comprise a speed or acceleration of vehicle 210. An increase in acceleration or velocity may raise the height of the focal region, and a deceleration or decrease in velocity may lower the focal region.

In particular embodiments, focal region 280 may be determined based on an upcoming change in direction of the vehicle based on information defining a route of travel. The information defining the route of travel may be inputted by the user.

Figure 3:
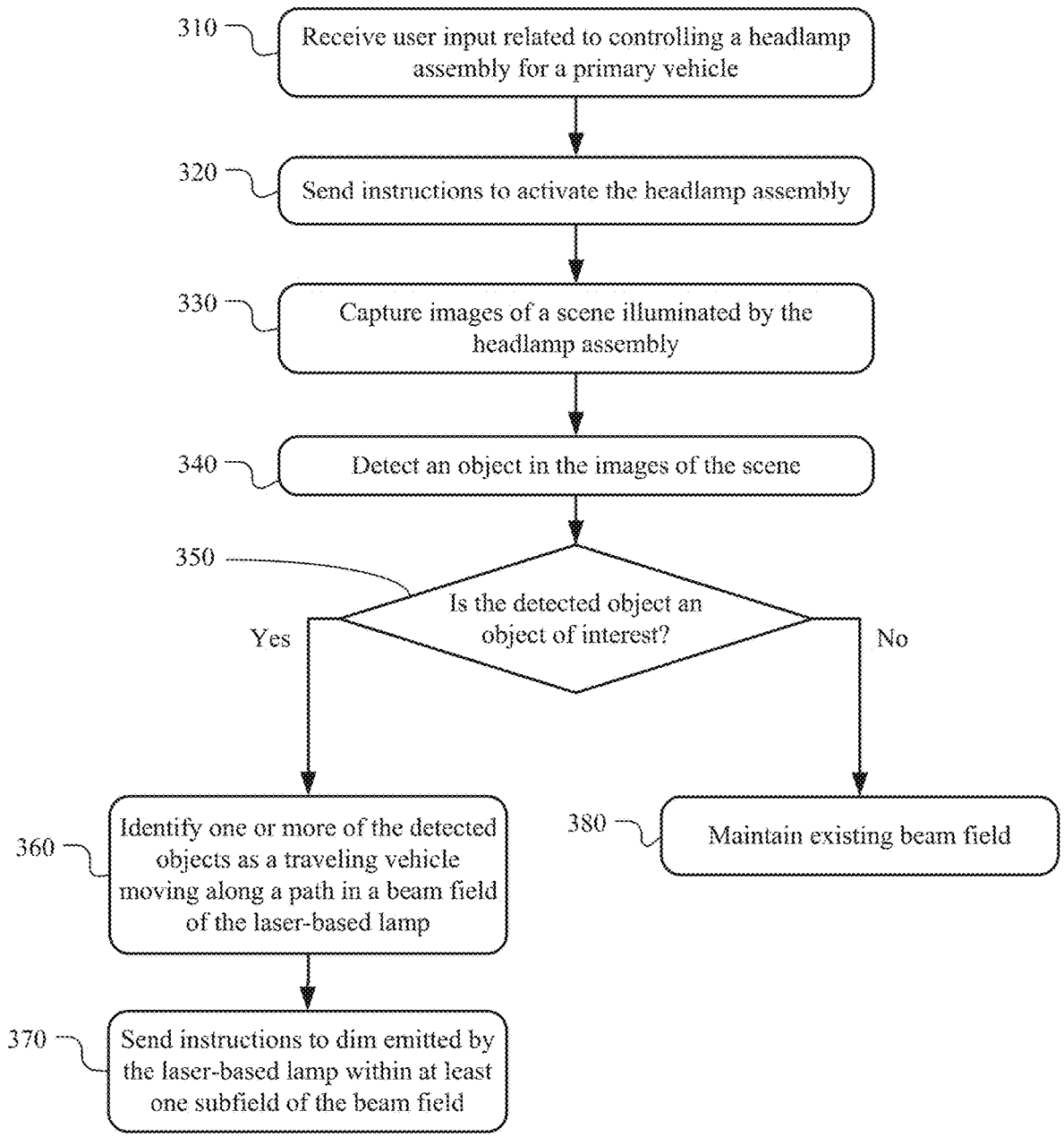
FIG. 3 is a flowchart illustrating a method of dimming light within a beam subfield of a beam field for traffic shielding.

FIG. 3 is a flowchart depicting a method 300 of shielding traffic including steps performed to dim light within a beam subfield of a beam field. Method 300 may begin at step 310 with the control module receiving user input related to controlling a headlamp assembly 235 for vehicle 210. Method 300 may then continue at step 320 with the control module sending instructions to activate the headlamp assembly. Method 300 may then continue at step 330 with the light sensor capturing images of a scene illuminated by headlamp assembly 235. Method 300 may then continue at step 340 with the control module detecting one or more objects in the images of the scene. At decision point 350, the control module may determine whether any of the detected objects are objects of interest for which the headlamp illumination should be dimmed (e.g., in order to shield the objects of interest from being blinded). If a detected object is identified as an object of interest, method 300 may then continue at step 360 with the control module identifying one or more of the detected objects as a traveling vehicle moving along a path in beam field 230 of the laser-based lamp. Method 300 may continue at step 370 with the control module sending instructions to dim light emitted by the laser-based lamp within at least one beam subfield 220 of beam field 230. Otherwise, if no objects of interest are identified, then at step 380, the control module maintains the existing beam field 230.

Figure 4:
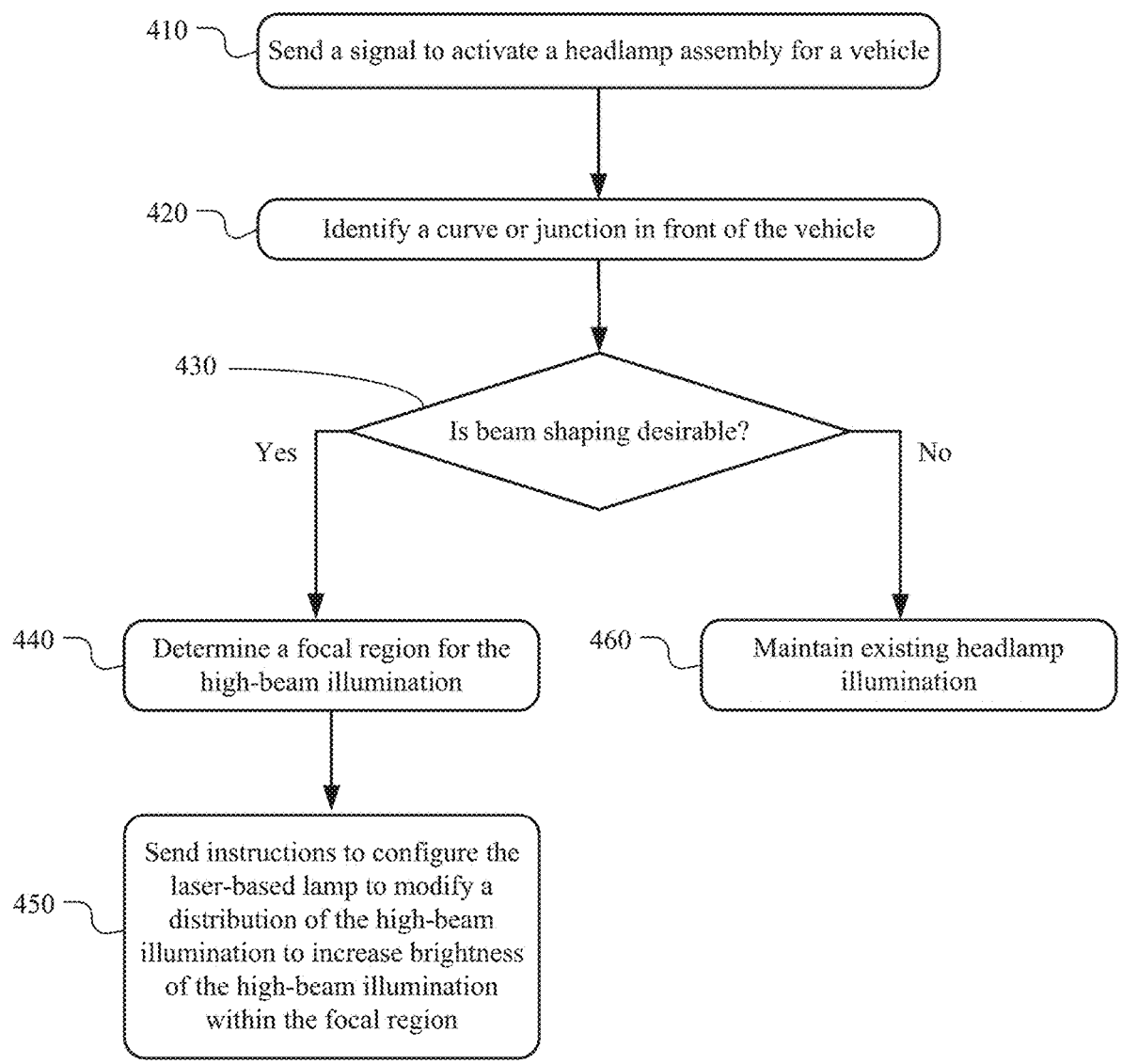
FIG. 4 is a flowchart illustrating a method of increasing brightness within a prescribed focal region for bending light.

FIG. 4 is a flowchart depicting a method 400 of bending light including steps performed to increase brightness within a prescribed focal region. Method 400 may begin at step 410 with the control module sending a signal to activate headlamp assembly 235 for vehicle 210. Method 400 may then continue at step 420 with the control module identifying curve 290 or junction in front of vehicle 210. At decision point 430, the control module may determine whether beam shaping is desirable—this determination may be based on an assessment of the landscape visible in front of the vehicle (e.g., if an estimated curvature of curve 290 exceeds a threshold), global positioning coordinates associated with the vehicle and area near the vehicle (mountainous areas where street lights are less likely), and/or vehicle service or insurance information associated with a known location near the vehicle (e.g., accidents have been reported at vehicle service center or through insurance reporting). If beam shaping is determined to be desirable, method 400 may then continue at step 440 with the control module determining focal region 280 for the high-beam illumination. In some embodiments, step 440 may include activating the high-beam illumination if not already activated. Method 400 may then continue at step 450 with the control module sending instructions to configure the laser-based lamp to modify a distribution of the high-beam illumination within focal region 280. The distribution may be modified by modifying the brightness of the one or more beam subfields. The distribution may also be modified by modifying the shape of the one or more beam subfields. Otherwise, if beam shaping is not determined to be desirable, then at step 460, the control module maintains the existing headlamp illumination.

The junction in front of vehicle 210 may be two or more roadways or walkways intersecting. Junctions may include, four-way 90-degree intersections, on- or off-ramps from highways, roundabouts, T-intersections, or pedestrian crosswalks across a roadway. The junction may include one or more corners.

Modify a distribution of the high-beam illumination within focal region 280 may be based on weather conditions. For example, during heavy fog weather conditions, the focal region may be lowered to reduce high-beam glare from light reflecting off the fog.

Figure 5:
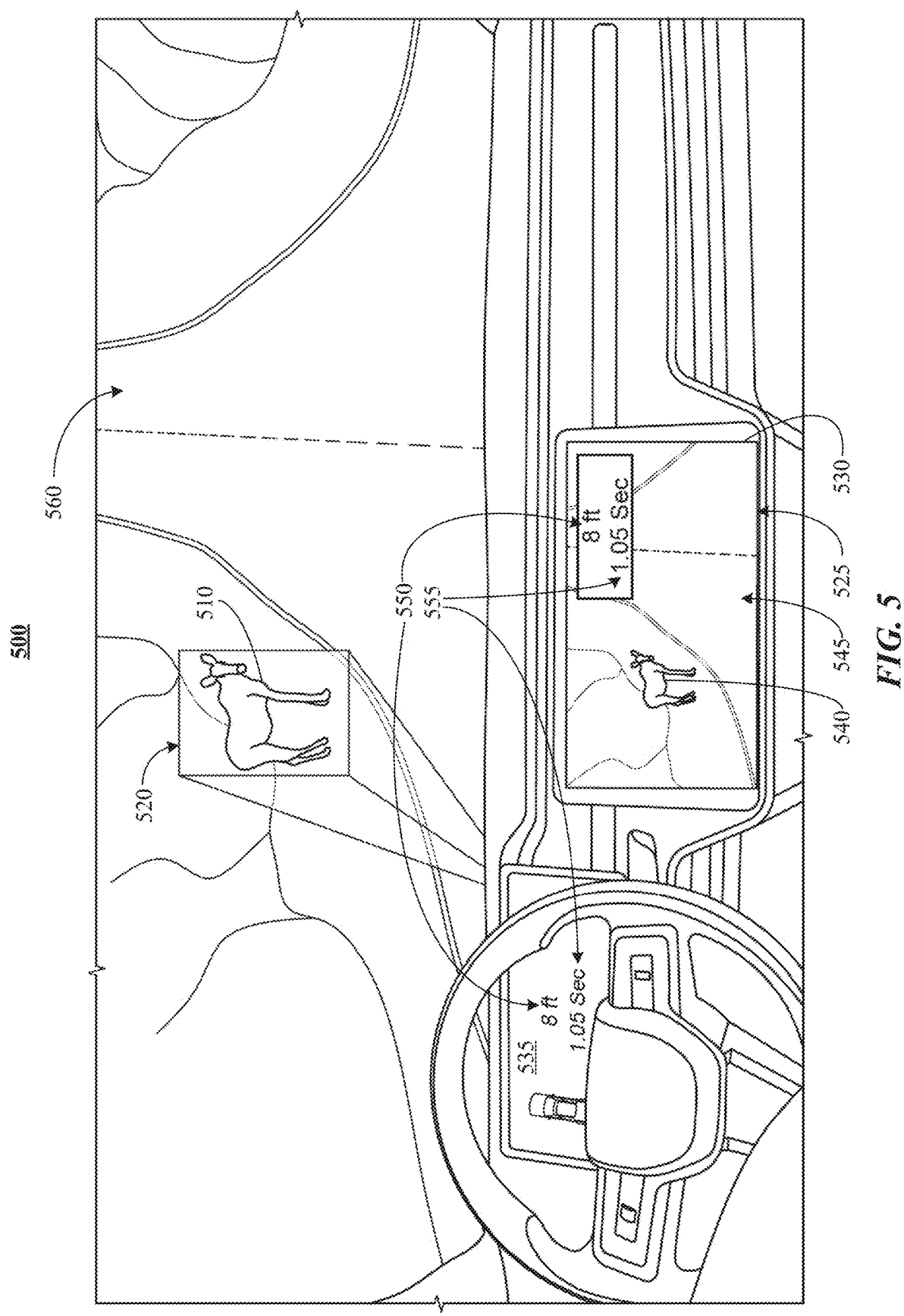
FIG. 5 illustrates an example of object detection.

FIG. 5 illustrates an example object detection. Object 510 may be illuminated by infrared light 520. The infrared light may originate from the laser low-beam lamp with infrared capabilities or high-beam lamp with high-beam boost and infrared capabilities. Object 510 may also be illuminated by white light. Images of a scene illuminated by the headlamp assembly may be captured by a light sensor. The light sensor may be capable of capturing images in the visible spectrum or the infrared spectrum. The light sensor may also be capable of determining a distance to the object of interest based on the infrared light. Images of a scene captured in infrared may be converted to the visible spectrum. Displayed images 525 may be the converted images of a scene or images of a scene originally captured in the visible spectrum. Displayed images 525 may be displayed on infotainment screen 530 or dash screen 535.

Object 510 may be detected as an object of interest. The detecting may comprise segmenting the captured images to locate boundaries of object 510 in the images of the scene. Object 510 may be partially occluded by the scene in the captured images. The detecting may further comprise classifying object 510 as being an object of interest based on features of object 510 in the images of the scene. Features of object 510 may comprise an estimation of a size of object 510, a shape of object 510 based on the boundaries, a proximity of object 510 to the vehicle, a kinematics assessment of object 510, a classification of object 510 as stationary or moving, a classification of object 510 as a live human or animal or neither, a classification of object 510 as a change in terrain, an estimated type of damage to vehicle 210 attributable to an impact with object 510. The kinematics assessment may comprise an estimated mass of object 510, a calculated acceleration of object 510, a calculated velocity of object 510, a calculated relative velocity between object 510 and vehicle 210, a predicted trajectory of object 510, an estimated force of impact with object 510; or a time to impact for the object 510, which may be classified as an object of interest. The detecting may comprise determining whether the predicted trajectory of object 510 intersects with identified roadway 560. The classifying may comprise determining a level of risk of a negative outcome associated with encountering each of the objects in the scene based on the features of the illuminated objects in the images of the scene. The negative outcome may be an outcome that poses a hazard to vehicle 210 or its occupants.

Object 510 may be classified as a live human or animal based on the shape of the illuminated object. The classification may be further based on whether the illuminated object is classified as moving. The classification of the object as moving may be based on the calculated velocity or the calculated acceleration of the illuminated object as non-zero.

In particular embodiments, displayed images 525 may contain depiction of object 540 or depiction of roadway 545. Depiction of object 540 may be based on object 510. Depiction of roadway 545 may be based on roadway 560. Displayed images 525 may also contain distance information 550 and time to impact information 555. Displayed images 525 may also contain a position of object 510, or a velocity of object 510, or a classification-based label for object 510.

In some embodiments, vehicle 210 may provide alerts by displaying a visual output or visual indicators on infotainment screen 530, heads-up display, or dash screen 535. The visual output or visual indicators may include information regarding distance to the object of interest, a classification of the object of interest, or a type of damage if vehicle 210 is impacted with the object of interest. Alerts may also be provided by emitting an auditory output by one or more speakers of vehicle 210. Alerts may also be generated haptic feedback by one or more actuators in an internal component of vehicle 210 in contact with a driver of the vehicle. The intensity of the alerts may vary with the risk of impact with the object of interest. When object 510 is classified as a live human or animal, vehicle 210 may activate sound-making devices or one or more lights external to the vehicle. The sound-making devices or one or more lights may be configured to alert the live human or animal of vehicle 210.

In some embodiments, alerts may be displayed on infotainment display 530, dash display 535, or the heads-up display at the same time. In some embodiments, alerts on the heads-up display may be displayed at a different time than the alert is displayed on infotainment display 530 or dash display 535. The alert may be displayed on the heads-up display when the driver is closer to the object of interest. For example, the heads-up display may provide a last opportunity reminder to the driver in the event the driver has not reacted to the alert displayed on infotainment display 530, dash display 535, or the auditory or haptic feedback associated with the alert. The alert may also be displayed on the heads-up display when the features of the objects of interest have changed. For example, the heads-up display may provide an additional alert when a formerly stationary animal begins to move towards the vehicle.

Figure 6:
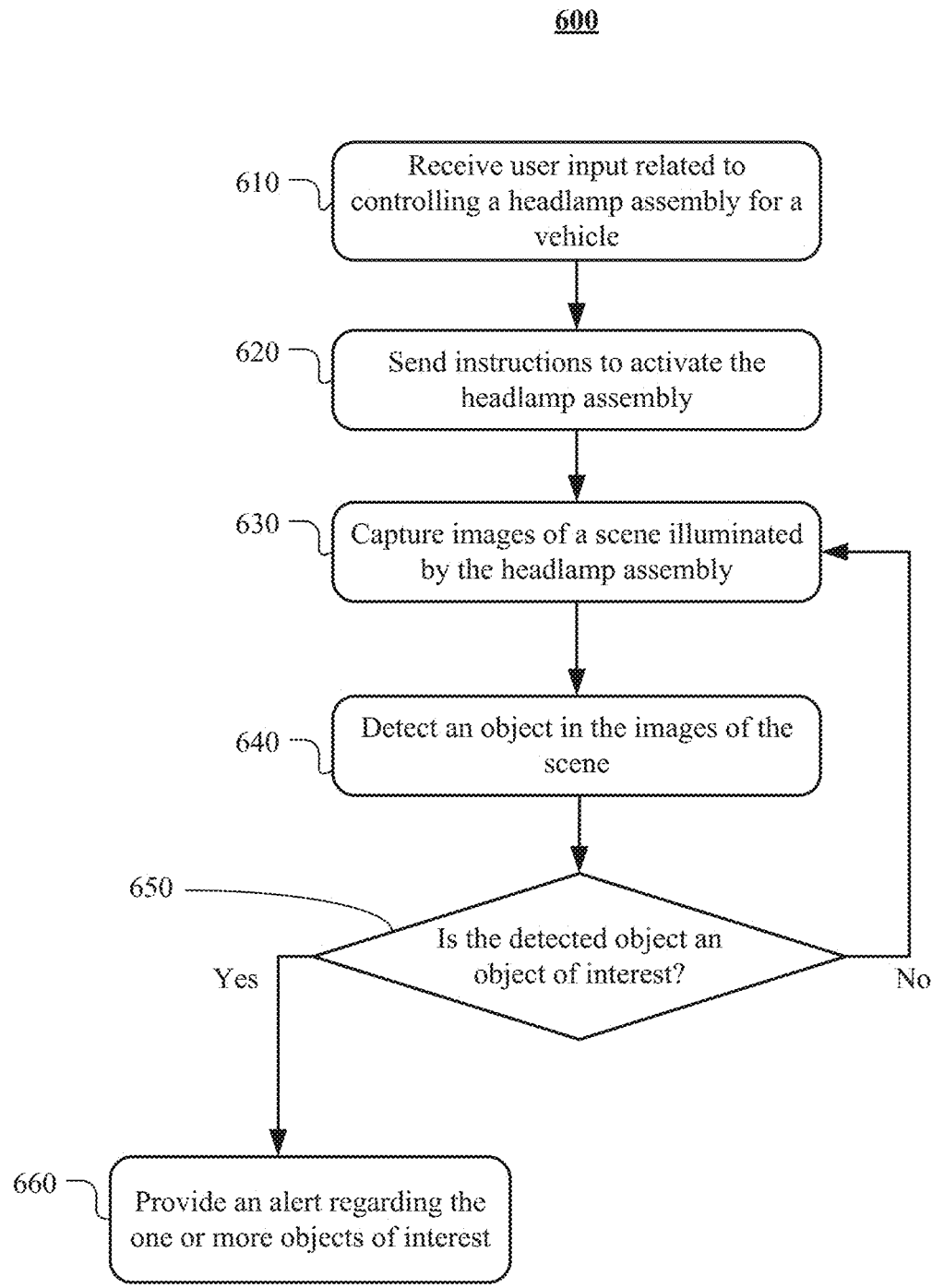
FIG. 6 is a flowchart illustrating a method of hazard detection.

FIG. 6 is a flowchart depicting a method 600 for detecting a hazard. Method 600 may begin at step 610 with the control module receiving user input related to controlling a headlamp assembly 235 for vehicle 210. Method 600 may then continue at step 620 with the control module sending instructions to activate the headlamp assembly 235. Method 600 may then continue at step 630 with the control module capturing images of the scene illuminated by the headlamp assembly 235. Method 600 may then continue at step 640 with the control module detecting an object of interest in the images of the scene. At decision point 650, the control module may determine whether any of the detected objects are objects of interest for which the headlamp illumination should be dimmed (e.g., in order to shield the objects of interest from being blinded). If a detected object is identified as an object of interest, method 600 may then continue at step 660 with the control module providing an alert regarding the one or more objects of interest. Otherwise, if no objects of interest are identified, then the control module returns to capturing images of the scene.

Figure 7A:
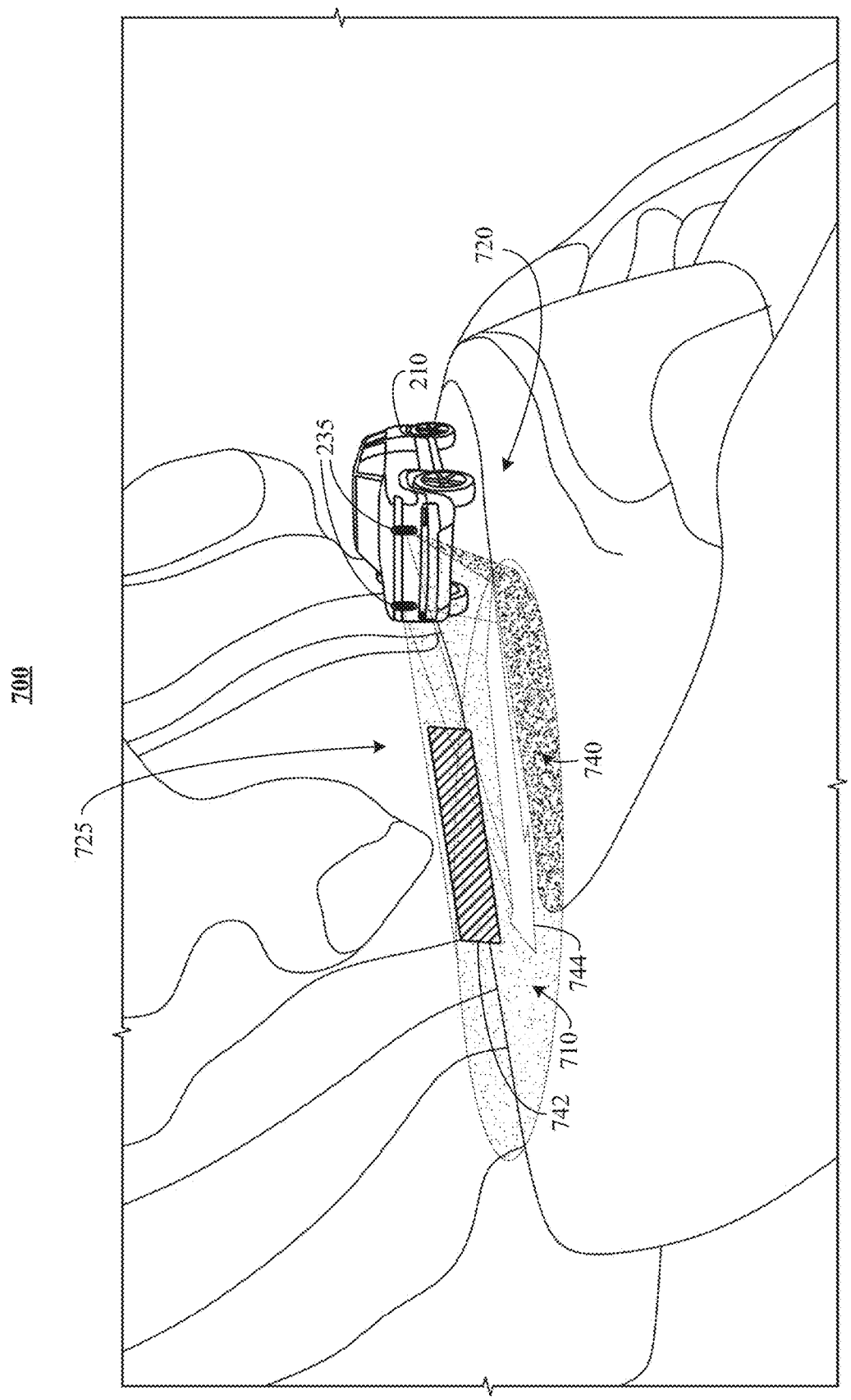
FIG. 7A illustrates an example off-road hazard detection.

FIG. 7A illustrates an example hazard detection 700. Vehicle 210 may output white light 710 or infrared light from headlamp assembly 235. The white light 710 or infrared light may illuminate a hazard. The hazard may be a cliff drop-off 720 or cliff wall 725. The hazard may be detected based on vehicle's 210 capabilities. Vehicle's 210 capabilities may comprise an approach angle, a break-over angle, a departure angle, drive system (e.g., all-wheel drive, four-wheel drive, or two-wheel drive), stopping power of brakes, coefficient of friction of tires, or turning radius.

In particular embodiments, when the hazard is detected, one or more visual indicators, or graphics, may be shown to identify the hazard. The graphics may be projected from headlamp assembly 235 of vehicle 210. The graphics may also be projected inside the vehicle to a heads-up display. The graphics may differ depending on the hazard. For example, when the hazard is a cliff-drop off 720, the drop graphic 740 may be displayed to indicate the area as a drop. When the hazard is cliff wall 725, wall-graphic 742 may be displayed. Graphics may also comprise a highlighted path 744 to avoid the hazard. The graphics may compensate for the terrain such that the graphic is understandable by the driver. For example, the projection of the graphics may compensate for the slope of the surface the graphic is displayed upon to minimize distortion.

Figure 7B:
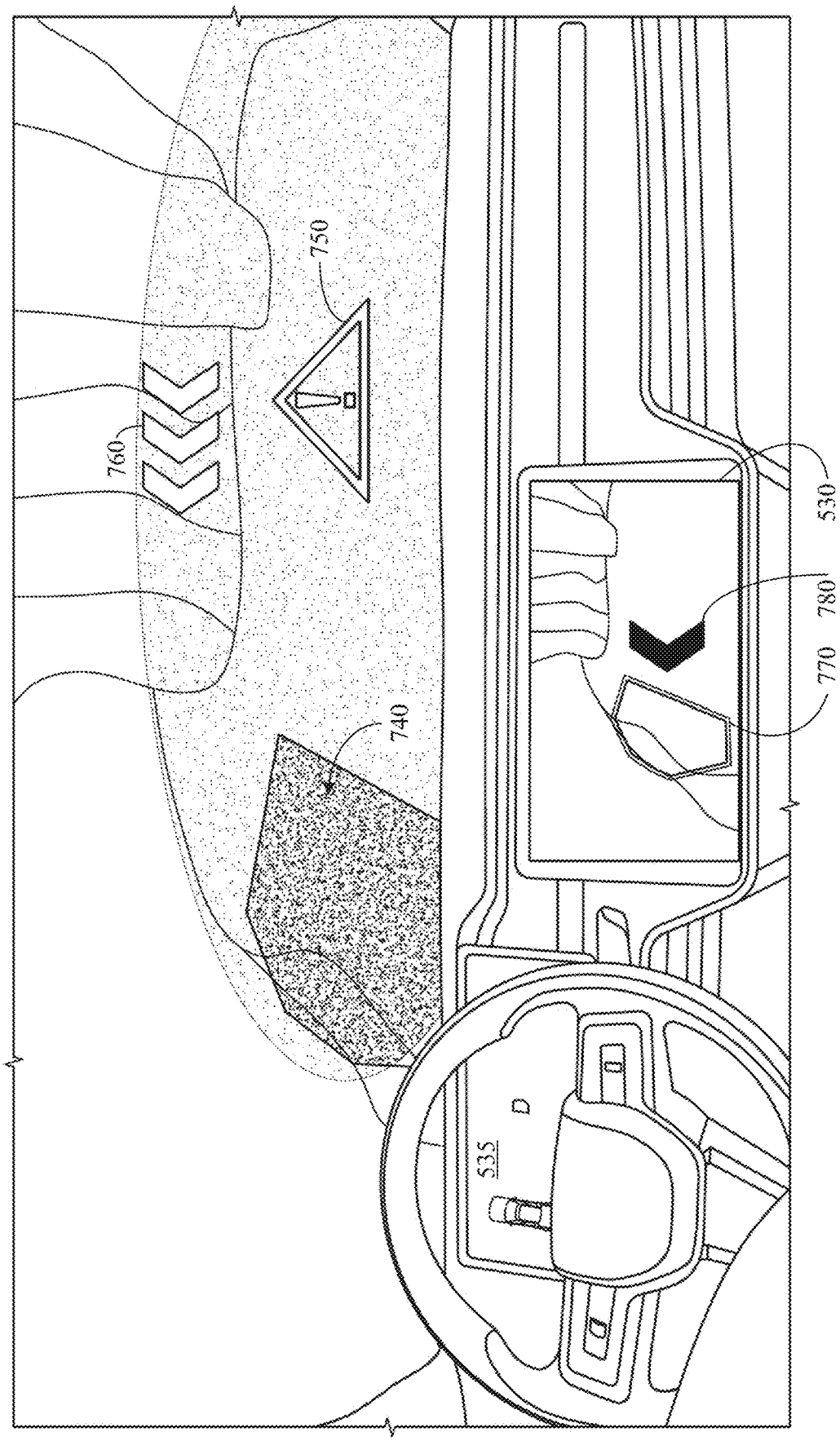
FIG. 7B illustrates example alerts of an off-road hazard to a driver.

FIG. 7B illustrates example alerts of a hazard to the driver. The alerts may include various graphics and symbols to indicate a hazard. The graphics and symbols may include warning triangle 750, turning indicator 760, drop-graphic 740, drop-boundary 770, or hazard indicator 780. The graphics and symbols may also include a direction graphic, a proximity graphic, or a pathway graphic.

In particular embodiments, the alerts may be displayed on infotainment display 530 or dash display 535. The alerts may also be displayed on a heads-up display. The alerts may be projected from headlight assembly 235.

Figure 8:
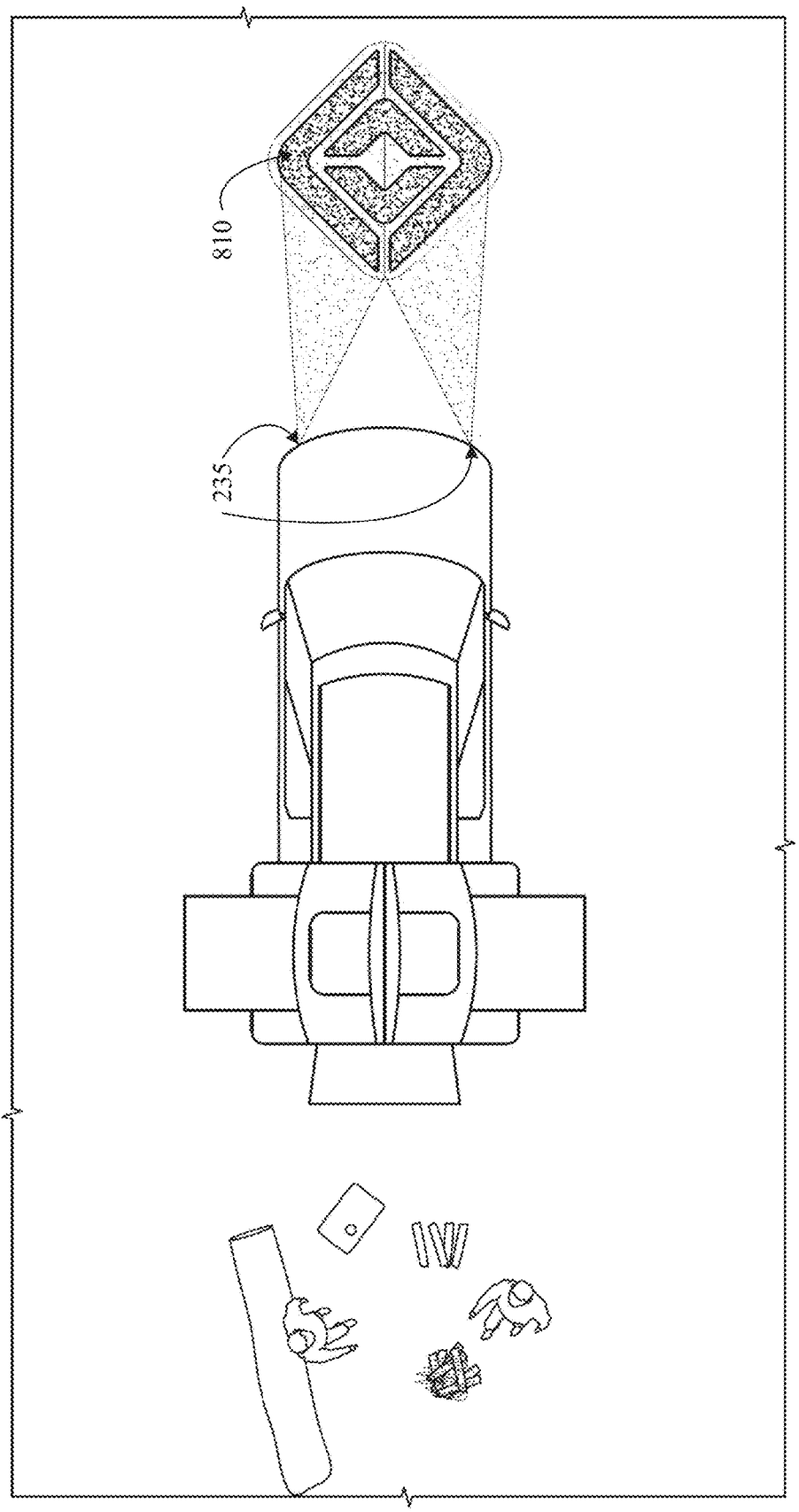
FIG. 8 illustrates an example headlamp assembly graphic projection.

FIG. 8 illustrates an example headlamp assembly graphic projection 800 of vehicle 210. Graphics 810 are projected from headlamp assembly 235. Graphics may comprise images or symbols. Graphics 810 may be used to play one or more games.

Figure 9:
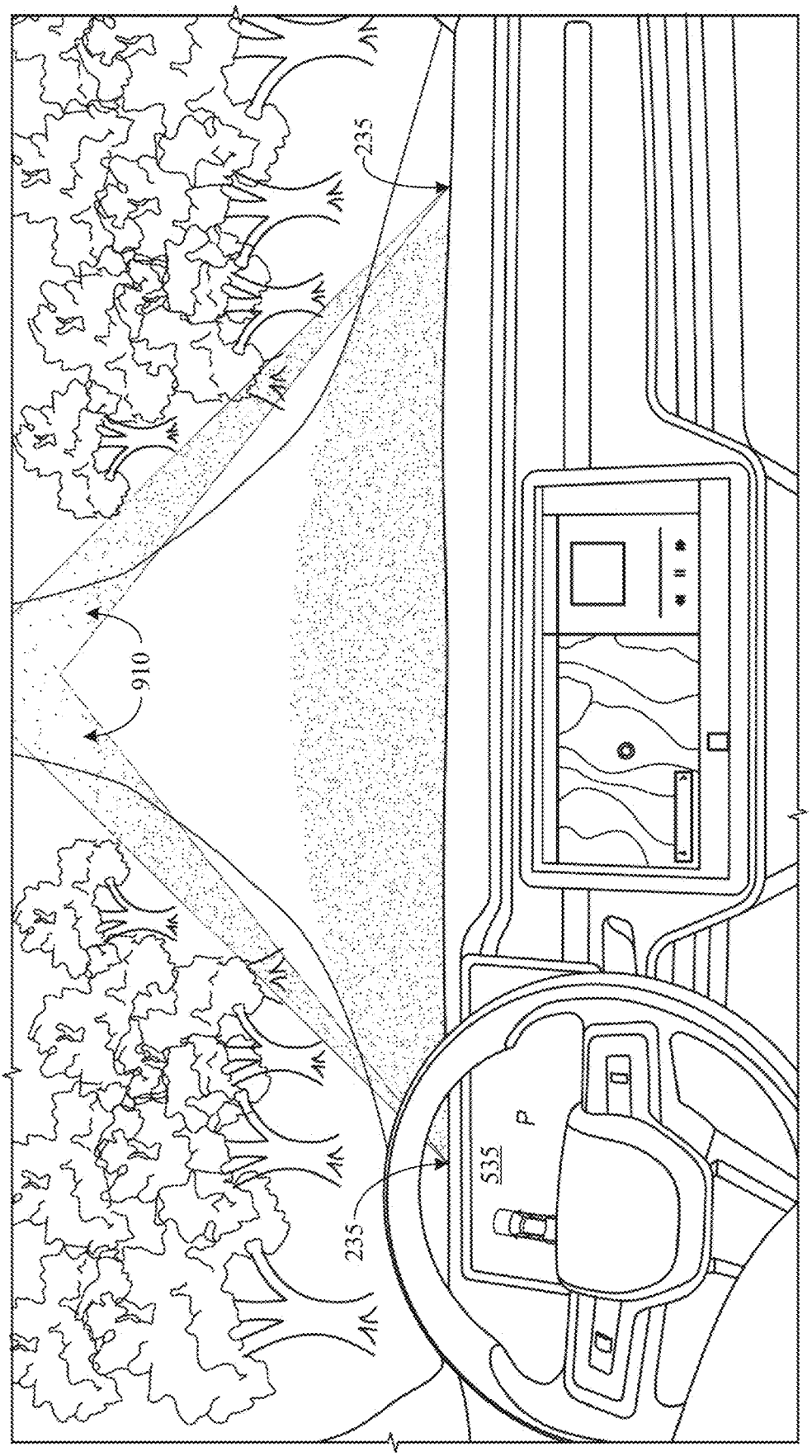
FIG. 9 illustrates an example high-beam illumination with high-beam boost.

FIG. 9 illustrates an example high-beam boost illumination 910 from headlamp assembly 235. The high-beam boost may be a higher light output than traditional high-beam headlamps. The high-beam boost may reach a distance of about 630 meters when traveling on regulated roads (e.g., city roads or highways). The high-beam boost may reach a distance of about 1000 meters on unregulated roads (e.g., dirt trails or off-road).

Figure 10A:
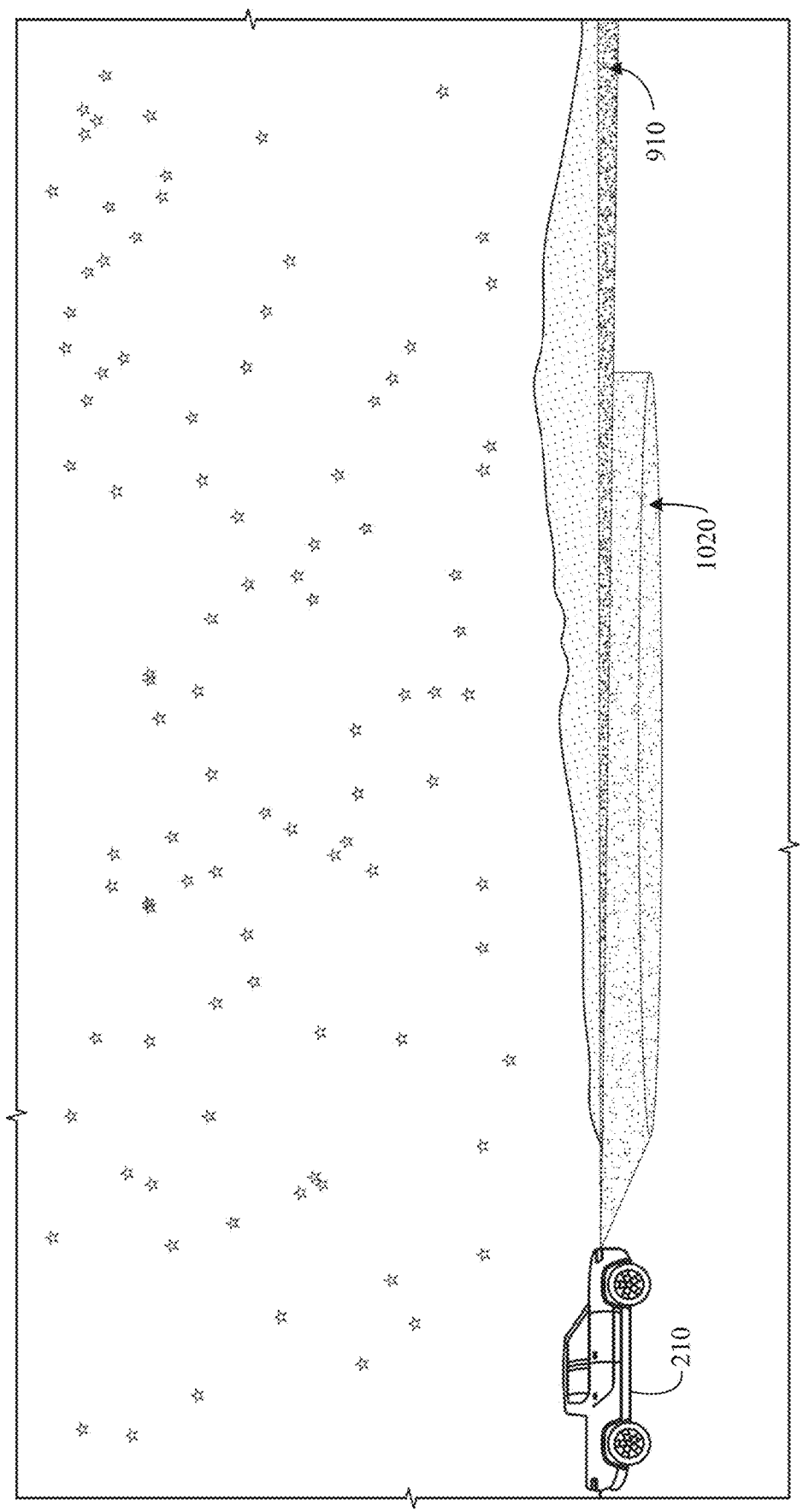
FIGS. 10A and 10B illustrate different example views of an off-road high-beam illumination with high-beam boost and a high-beam illumination.

FIG. 10A illustrates an example side view of high-beam boost illumination 910 and high-beam illumination 1020 of vehicle 210. High-beam boost illumination 1010 may illuminate a greater distance than high-beam illumination 1020. High-beam illumination 1020 may illuminate a wider area than high-beam boost illumination 910.

Figure 10B:
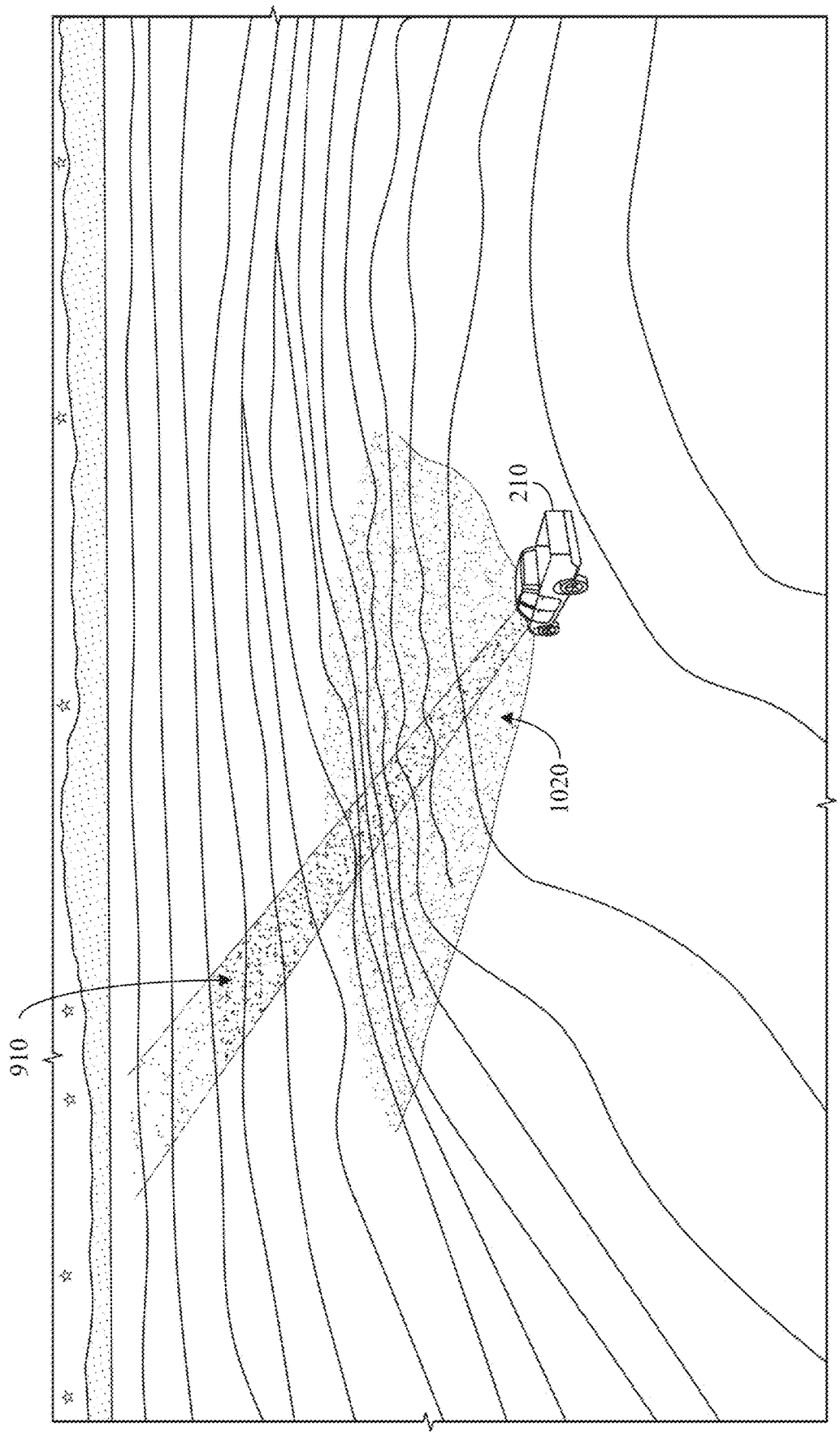

FIG. 10B illustrates an example perspective view of high-beam boost illumination 1010 and high-beam illumination 1020 of vehicle 210. High-beam boost illumination 910 may illuminate a greater distance than high-beam illumination 1020. High-beam illumination 1020 may illuminate a wider area than high-beam boost illumination 910.

Figure 11:
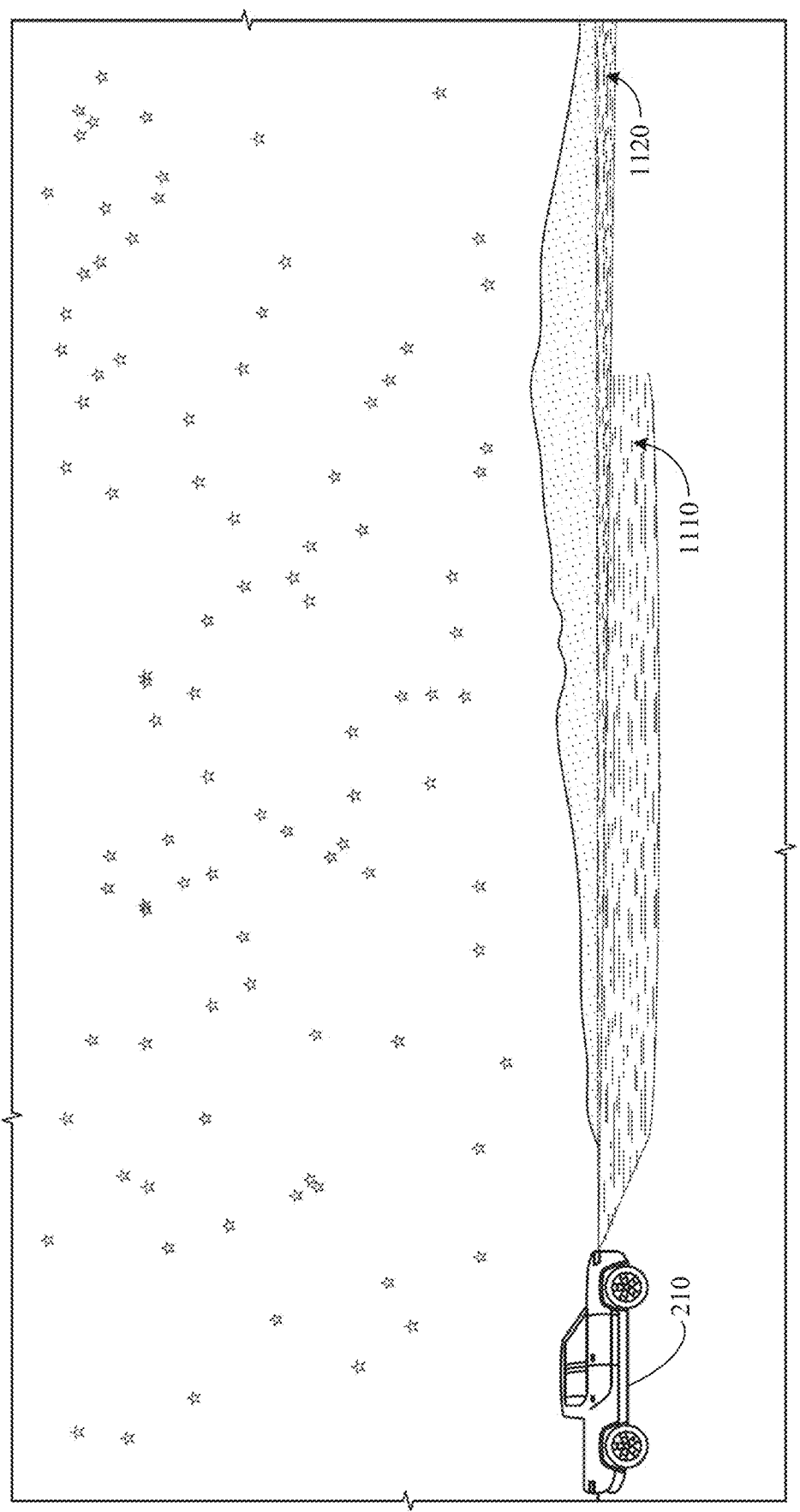
FIG. 11 illustrates an example side view of an infrared low-beam.

FIG. 11 illustrates an example side view of the infrared low-beam illumination 1110 and infrared high-beam illumination 1120. Infrared high-beam illumination 1120 may illuminate a greater distance than infrared low-beam illumination 1110. Infrared low-beam illumination 1110 may illuminate a wider area than infrared high-beam illumination 1120.

Figure 12:
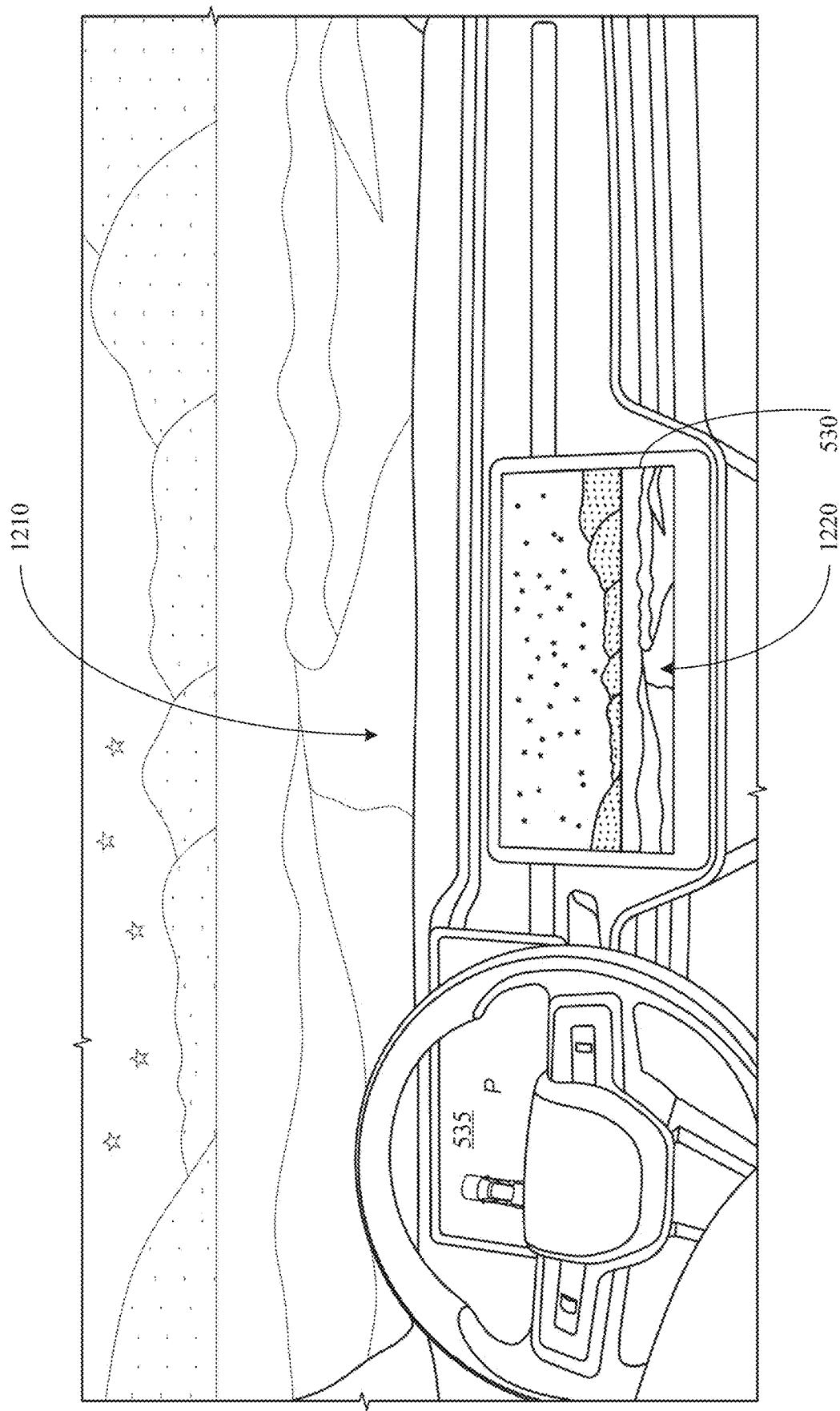
FIG. 12 illustrates an example interior view of a low-light driving assistant.

FIG. 12 illustrates an example interior view of the infrared low-beam image capture. Infrared light emitted from a laser low-beam lamp or a laser high-beam lamp may illuminate a low-light scene 1210. The illuminated low-light scene 1210 may be captured by a light sensor. The captured infrared image may be converted to a visible spectrum or to a gray scale image. The converted image 1220 may be displayed on infotainment screen 530. The converted image may also be displayed on dash screen 535. The converted image displayed may aid the driver in navigating without the use of white-light illumination. Infrared illumination may be less intrusive or disruptive as compared to white-light illumination. For example, white-light illumination may cause wild animals to approach vehicle 210.

Figure 13A:
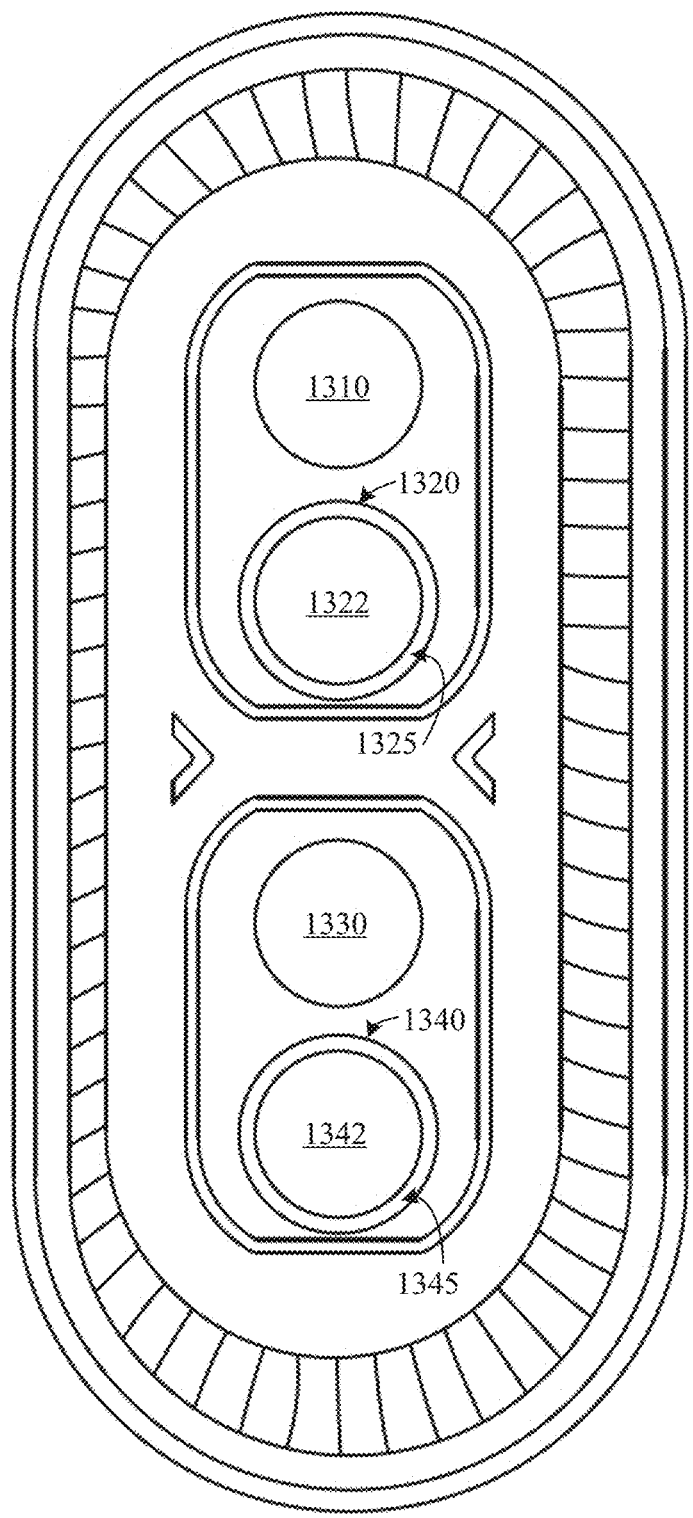
FIG. 13A illustrates an example four-lamp headlamp assembly configuration.

FIG. 13A illustrates an example four lamp headlamp assembly 1300A configuration. Laser low-beam lamp 1310 may provide broad-spectrum incoherent white light. Laser low-beam lamp with infrared capabilities 1320 may provide broad-spectrum incoherent white light and infrared spectrum light. Laser low-beam lamp with infrared capabilities 1320 may be integrated into a single laser-based light source. Laser low-beam lamp with infrared capabilities may comprise laser low-beam 1322 and infrared low-beam 1325. Infrared low-beam 1325 may be positioned as a ring about laser low-beam 1322.

High-beam matrix lamp 1330 may increase or decrease the brightness of a portion (e.g., a subfield) of the high-beam beam field. The high-beam matrix lamp may change the brightness of a portion of the high-beam beam field without changing the brightness of another portion of the high-beam beam field. When the portion of the high-beam beam field brightness is decreased, the power consumed by the high-beam matrix lamp may decrease.

Laser high-beam lamp with infrared capabilities 1340 may provide broad-spectrum incoherent white light and infrared spectrum light. Laser high-beam lamp with infrared capabilities 1340 may also comprise a high-beam boost lamp. The high-beam boost lamp may output light about one kilometer in distance. The high-beam boost lamp may also be integrated with the laser high-beam lamp such that the laser high-beam lamp operates as a laser high-beam lamp until high-beam boost is enabled. When high-beam boost is enabled, the integrated laser high-beam lamp may operate as a high-beam boost lamp.

Laser low-beam lamp with infrared capabilities 1340 may be integrated into a single laser-based light source. Laser high-beam lamp with infrared capabilities 1340 may comprise laser high-beam 1342 and infrared high-beam 1345. Laser high-beam 1342 may also comprise the high-beam boost lamp. Infrared high-beam 1345 may be positioned as a ring about laser high-beam with high-beam boost 1342.

Laser low-beam lamp 1310 or laser low-beam lamp with infrared capabilities 1320 may output a broad-spectrum incoherent white light beam field with, by way of example and not limitation, a vertical beam spread of up to 25 degrees and the vertical beam spread may be 15 degrees above and 10 degrees below a horizontal center line of the white-light beam field. High-beam matrix lamp 1330 or laser high-beam with infrared capabilities 1340 may output a white light beam field with, by way of example and not limitation, a vertical beam spread of up to 10 degrees and the vertical beam spread may be 5 degrees above and 5 degrees below a horizontal center line of the white light beam field.

Figure 13C:
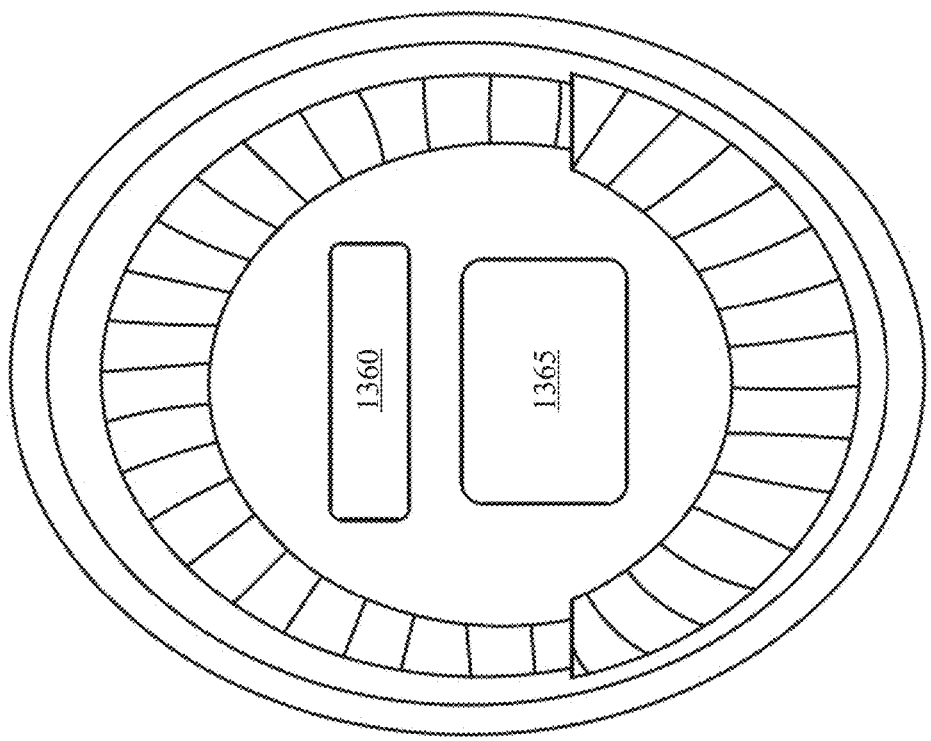
FIG. 13C illustrates an example two-lamp headlamp assembly configuration.
Figure 13B:
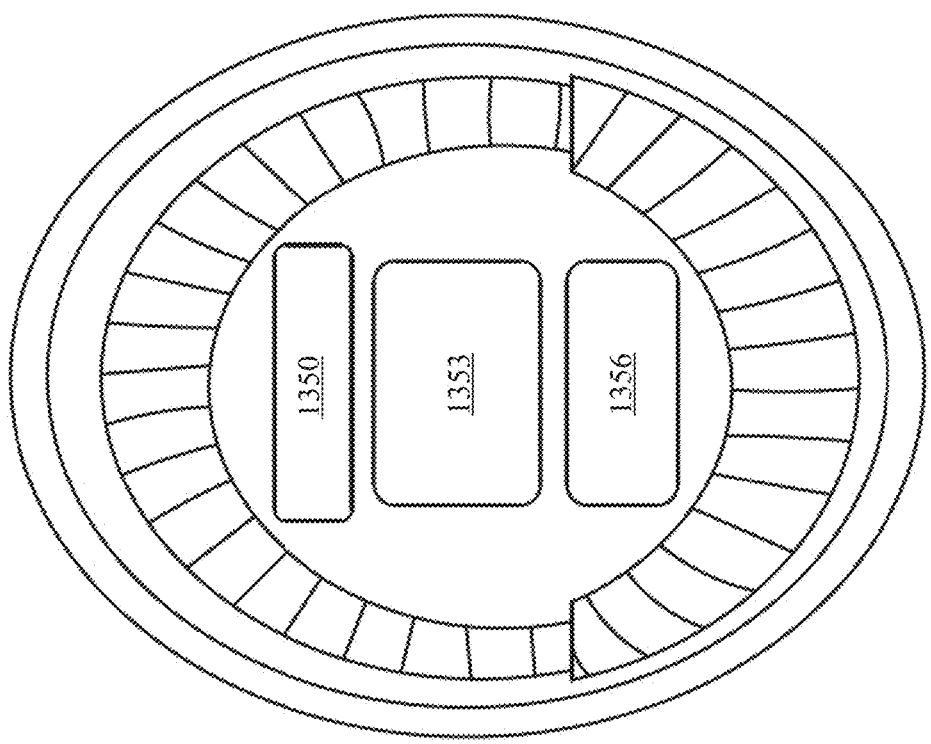
FIG. 13B illustrates an example three-lamp headlamp assembly configuration.

FIG. 13B illustrates an example three lamp headlamp configuration 1300B. First lamp 1350 may be a laser low-beam lamp 1310, a laser low-beam lamp with infrared capabilities 1320, a high-beam matrix lamp 1330, or a high-beam laser lamp with infrared capabilities 1340. Second lamp 1353 may be a laser low-beam lamp 1310, a laser low-beam lamp with infrared capabilities 1320, a high-beam matrix lamp 1330, or a high-beam laser lamp with infrared capabilities 1340. Third lamp 1356 may be a laser low-beam lamp 1310, a laser low-beam lamp with infrared capabilities 1320, a high-beam matrix lamp 1330, or a high-beam laser lamp with infrared capabilities 1340.

FIG. 13C illustrates an example two-lamp headlamp configuration 1300C. Top lamp 1560 may be a laser low-beam lamp 1310, a laser low-beam lamp with infrared capabilities 1320, a high-beam matrix lamp 1330, or a high-beam laser lamp with infrared capabilities 1340. Bottom lamp 1365 may be a laser low-beam lamp 1310, a laser low-beam lamp with infrared capabilities 1320, a high-beam matrix lamp 1330, or a high-beam laser lamp with infrared capabilities 1340.

Figure 14:
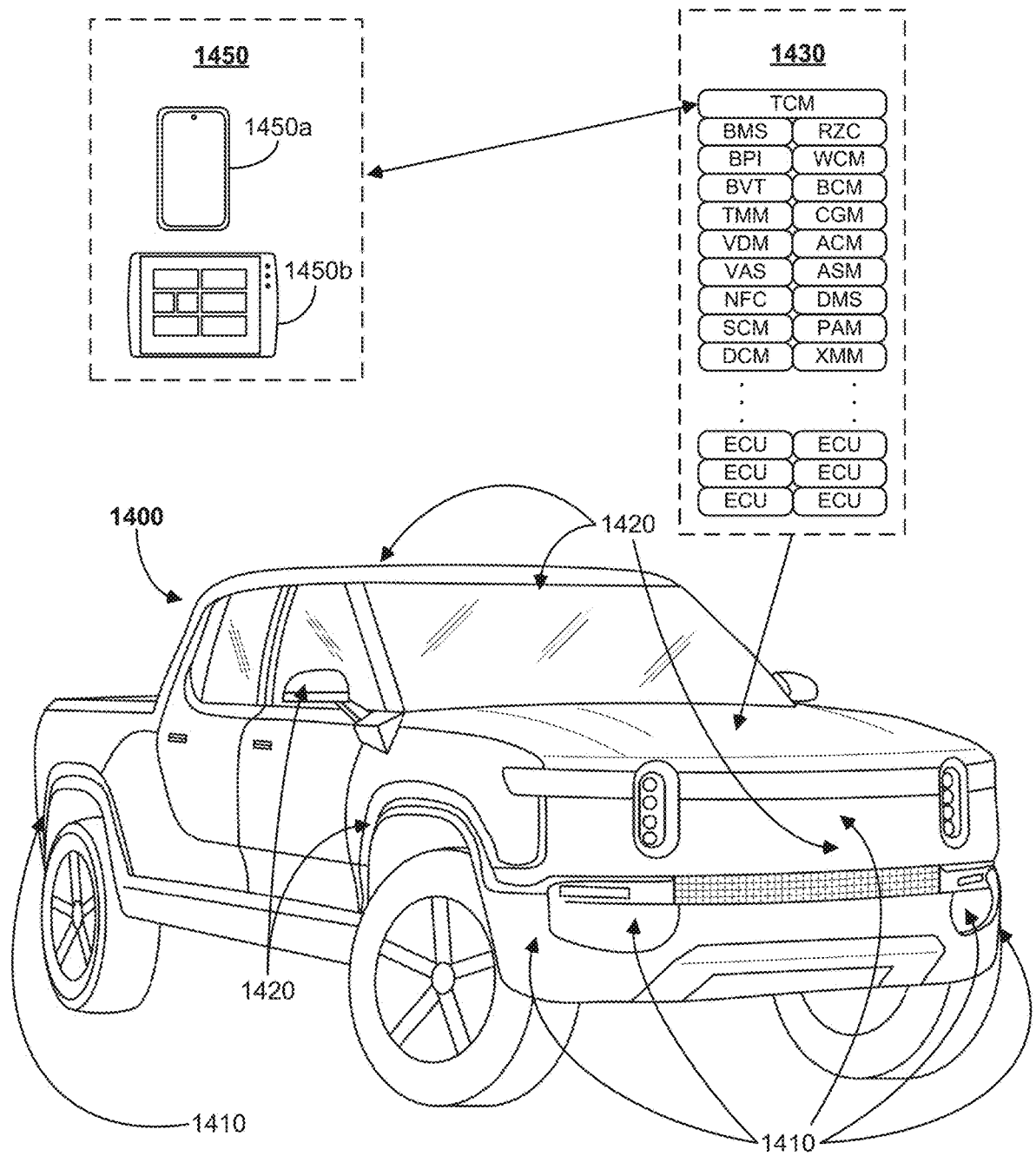
FIG. 14 illustrates an example vehicle.

FIG. 14 illustrates an example vehicle 1400. Vehicle 1400 may include multiple sensors 1410, multiple cameras 1420, and a control system 1430. In some embodiments, vehicle 1400 may be able to pair with a computing device 1450 (e.g., smartphone 1450a, tablet computing device 1450b, or a smart vehicle accessory). As an example and not by way of limitation, a sensor 1410 may be an accelerometer, a gyroscope, a magnometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 1420 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 1400 may include various controllable components (e.g., doors, seats, windows, lights, HVAC, entertainment system, security system), instrument and information displays and/or interactive interfaces, functionality to pair a computing device 1450 with the vehicle (which may enable control of certain vehicle functions using the computing device 1450), and functionality to pair accessories with the vehicle, which may then be controllable through an interactive interface in the vehicle or through a paired computing device 1450.

Control system 1430 may enables control of various systems on-board the vehicle. As shown in FIG. 14, control system 1430 may comprise one or more electronic control units (ECUs), each of which are dedicated to a specific set of functions. Each ECU may be a computer system (as described further in FIG. 16), and each ECU may include functionality provide by one or more of the example ECUs described below.

In particular embodiments, one or more functions of the headlamps as described herein may be controlled by a Body Control Module (BCM) ECU. The BCM ECU may provide electronic controls for various components of the body of the vehicle, such as, by way of example and not limitation: exterior lighting (e.g., headlamps, side lights, rear lights, camp lights) and interior lighting (e.g., cabin lights, seatbelt lights).

In particular embodiments, one or more functions of the headlamps as described herein may be controlled in part by information provided by ECUs providing automated driving system (ADS) and/or an advanced driver assistance system (ADAS) functionality. The ADS and/or ADAS systems may be enabled by a driver of the vehicle to provide one or more functions to support driving assistance and/or automation. An Autonomy Control Module (ACM) ECU may process data captured by cameras 1420 and/or sensors 1410. In some embodiments, the ACM ECU may provide artificial intelligence functionality to provide and/or refine functions to support driving assistance and/or automation. An Autonomous Safety Module (ASM) ECU may provide functions to support driving safety by monitoring sensors that support self-driving functions. A Driver Monitoring System (DMS) ECU may provide functionality to monitor and inform the control system about the driver's level of attention (e.g., while relying on driving assistance and/or automation functions).

In particular embodiments, one or more functions of the headlamps as described herein may be controlled through a user interface displayed on a dashboard of the vehicle by an Experience Management Module (XMM) ECU. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 1430. In some embodiments, functions of the ACM and the XMM may be combined together in an Autonomous eXperience Module (AXM) ECU.

In particular embodiments, one or more functions of the headlamps as described herein may be controlled in part by information provided by a Vehicle Dynamics Module (VDM) ECU may perform a number of different functions related to aspects of the vehicle's drivetrain, regenerative braking, suspension, steering, traction control, distribution of mass, aerodynamics, and driving modes. In some embodiments, a VDM ECU may, by way of example and not limitation, control vehicle acceleration, control vehicle energy regeneration, calculate torque distribution, provide traction control, control drive modes, provide odometer functions, control driveline disconnects, adjust damping, adjust roll stiffness, adjust ride height, automatically level a vehicle when on a slope, and control the emergency parking brake driver.

In particular embodiments, one or more functions of the headlamps as described herein may be controlled in part by information provided by a Telematics Control Module (TCM) ECU may provide a wireless vehicle communication gateway to support functionality such as, by way of example and not limitation, over-the-air (OTA) communication between the vehicle and the internet or the vehicle and a computing device 1450, in-vehicle navigation, vehicle-to-vehicle communication, communication between the vehicle and landscape features (e.g., automated toll road sensors, automated toll gates, power dispensers at charging stations), or automated calling functionality.

Vehicle 1400 may include one or more additional ECUs, such as, by way of example and not limitation: a Central Gateway Module (CGM) ECU, a Vehicle Access System (VAS) ECU, a Near-Field Communication (NFC) ECU, a Seat Control Module (SCM) ECU, a Door Control Module (DCM) ECU, a Rear Zone Control (RZC) ECU, a Winch Control Module (WCM) ECU. If vehicle 1400 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU.

Figure 15:
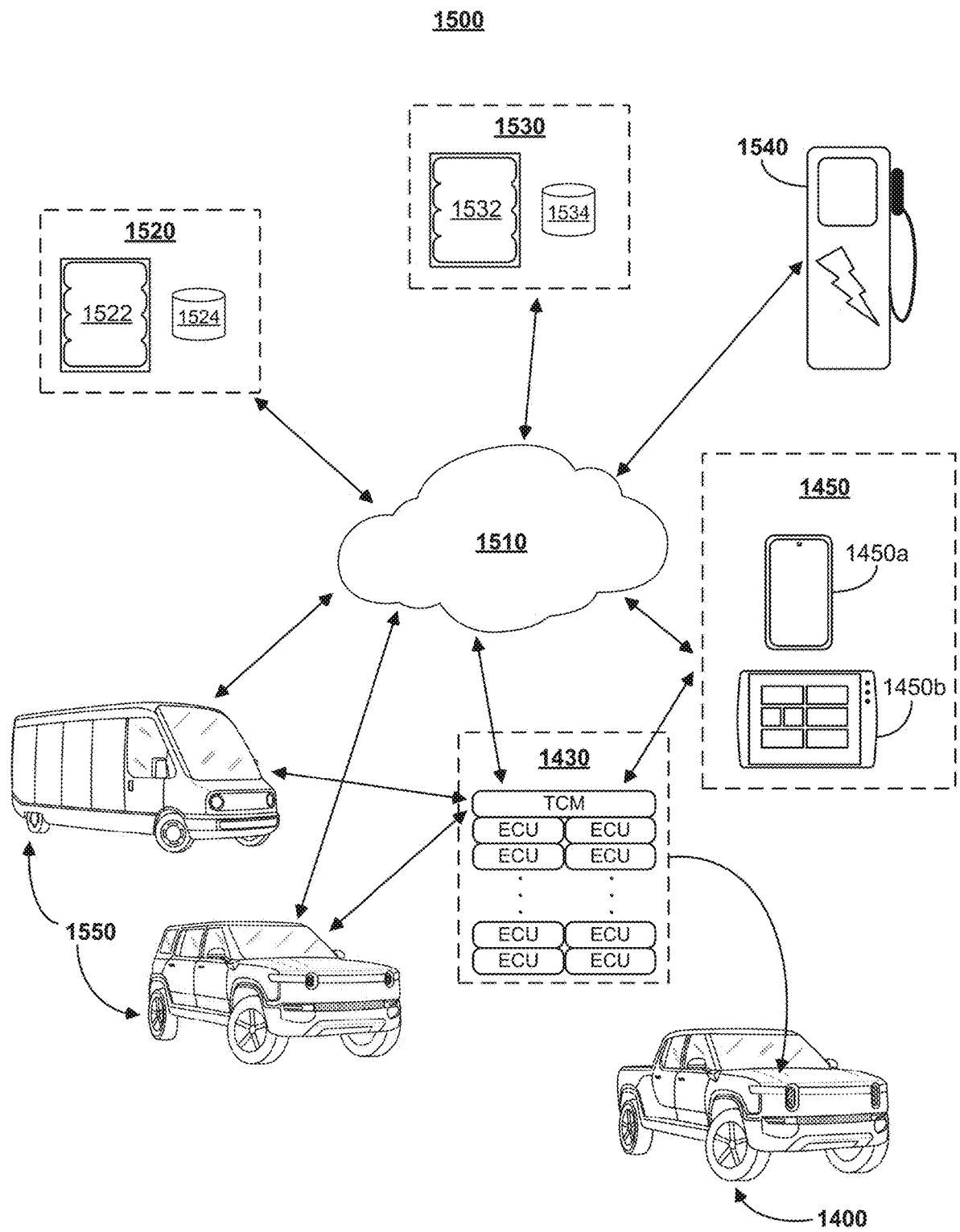
FIG. 15 illustrates an example network system including a connected vehicle.

FIG. 15 illustrates an example networked environment 1500. Computer system 1500 may include a connected vehicle 1400 with a control system 1430 that is capable of transmitting data to/from a network 1510. Network 1510 may also be connected to one or more computing servers 1520 (e.g., including compute units 1522 and storage units 1524) associated with a vehicle manufacturer, a vehicle service provider, a vehicle fleet operator, or a vehicle charging facility provider. Network 1510 may also be connected to one or more third-party computing servers 1530 (e.g., including compute units 1532 and storage units 1534) associated with, for example, a smart accessory manufacturer, a group event organizer, or a governmental organization. Networked environment 1500 may include one or more landscape features 1540 (e.g., automated toll road sensors, smart road signs or road markers, automated toll gates, power dispensers at charging stations). Networked environment 1500 may also include other connected vehicles 1550 that may be capable of communicating with vehicle 1400 through network 1510 and/or directly with vehicle 1400 (e.g., by communicating with a TMM ECU of a control system 1430 of vehicle 1400 when connected vehicle 1550 is within range of a short-range communications network, such as Bluetooth). Networked environment 1500 may also include one or more computing devices 1450 (e.g., smartphone 1450*a*, a tablet computing device 1450*b*, or a smart vehicle accessory) capable of communicating with network 1510 and/or directly with vehicle 1400.

Networked environment 1500 may enable transmission of data and communications between any of the depicted elements. In some embodiments, such information may be communicated in only one direction (e.g., a smart road sign broadcasting information related to traffic control or delays due to construction); in other embodiments, information may include two-way communications (e.g., an automated toll gate that processes a request received from vehicle 1400 to deduct a toll from a specified account and provides confirmation of the transaction). In particular embodiments, one or more elements of networked environment 1500 may include one or more computer systems, as described in further detail with respect to FIG. 16A. In particular embodiments, one or more elements of networked environment 1500 perform one or more steps of one or more methods described or illustrated herein. In particular embodiments, software running on one or more elements of networked environment 1500 may be controlled by a single entity to perform one or more steps of one or more methods described or illustrated herein or provide functionality described or illustrated herein.

FIG. 16A illustrates an example computer system 1600. Computer system 1600 may include a processor 1602, memory 1604, storage 1606, an input/output (I/O) interface 1608, a communication interface 1610, and a bus 1612. Although this disclosure describes one example computer system including specified components in a particular arrangement, this disclosure contemplates any suitable computer system with any suitable number of any suitable components in any suitable arrangement.

This disclosure contemplates any suitable number of computer systems 1600. This disclosure contemplates computer system 1600 taking any suitable physical form. As example and not by way of limitation, computer system 1600 may be an electronic control unit (ECU), an embedded computer system, a system-on-chip (SoC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server computing system, a tablet computer system, or a combination of two or more of these. Where appropriate, computer system 1600 may include one or more computer systems 1600; be unitary or distributed; span multiple locations; span multiple machines; span multiple data centers; or reside in a cloud, which may include one or more cloud components in one or more networks. Where appropriate, one or more computer systems 1600 may perform without substantial spatial or temporal limitation one or more steps of one or more methods described or illustrated herein. One or more computer systems 1600 may perform in real time or in batch mode one or more steps of one or more methods described or illustrated herein. One or more computer systems 1600 may perform at different times or at different locations one or more steps of one or more methods described or illustrated herein, where appropriate.

Processor 1602 (e.g., compute units 1522 and 1532) may include hardware for executing instructions, such as those making up a computer program. As an example and not by way of limitation, to execute instructions, processor 1602 may retrieve (or fetch) the instructions from an internal register, an internal cache, memory 1604, or storage 1606; decode and execute them; and then write one or more results to an internal register, an internal cache, memory 1604, or storage 1606 (e.g., storage units 1524 and 1534). Processor 1602 may include one or more internal caches for data, instructions, or addresses. This disclosure contemplates processor 1602 including any suitable number of any suitable internal caches. Processor 1602 may also include one or more instruction caches, one or more data caches, and one or more translation lookaside buffers (TLBs). Instructions in the instruction caches may be copies of instructions in memory 1604 or storage 1606, and the instruction caches may speed up retrieval of those instructions by processor 1602. Data in the data caches may be copies of data in memory 1604 or storage 1606 for instructions executing at processor 1602 to operate on; the results of previous instructions executed at processor 1602 for access by subsequent instructions executing at processor 1602 or for writing to memory 1604 or storage 1606; or other suitable data. The data caches may speed up read or write operations by processor 1602. The TLBs may speed up virtual-address translation for processor 1602. In particular embodiments, processor 1602 may include one or more internal registers for data, instructions, or addresses. This disclosure contemplates processor 1602 including any suitable number of any suitable internal registers, where appropriate. Where appropriate, processor 1602 may include one or more arithmetic logic units (ALUs); be a multi-core processor; or include one or more processors 1602. Although this disclosure describes and illustrates a particular processor, this disclosure contemplates any suitable processor.

In particular embodiments, memory 1604 includes main memory for storing instructions for processor 1602 to execute or data for processor 1602 to operate on. Computer system 1600 may load instructions from storage 1606 or another source (such as, for example, another computer system 1600) to memory 1604. Processor 1602 may then load the instructions from memory 1604 to an internal register or internal cache. To execute the instructions, processor 1602 may retrieve the instructions from the internal register or internal cache and decode them. During or after execution of the instructions, processor 1602 may write one or more results (which may be intermediate or final results) to the internal register or internal cache. Processor 1602 may then write one or more of those results to memory 1604. In particular embodiments, processor 1602 executes only instructions in one or more internal registers or internal caches or in memory 1604 (as opposed to storage 1606 or elsewhere) and operates only on data in one or more internal registers or internal caches or in memory 1604 (as opposed to storage 1606 or elsewhere). One or more memory buses (which may each include an address bus and a data bus) may couple processor 1602 to memory 1604. Bus 1612 may include one or more memory buses, as described below. In particular embodiments, one or more memory management units (MMUs) reside between processor 1602 and memory 1604 and facilitate accesses to memory 1604 requested by processor 1602. In particular embodiments, memory 1604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1604 may include one or more memories 1604, where appropriate. Although this disclosure describes and illustrates particular memory, this disclosure contemplates any suitable memory.

In particular embodiments, storage 1606 includes mass storage for data or instructions. As an example and not by way of limitation, storage 1606 may include a hard disk drive (HDD), a floppy disk drive, flash memory, an optical disc, a magneto-optical disc, magnetic tape, or a Universal Serial Bus (USB) drive or a combination of two or more of these. Storage 1606 may include removable or non-removable (or fixed) media, where appropriate. Storage 1606 may be internal or external to computer system 1600, where appropriate. Where appropriate, storage 1606 may include non-volatile, solid-state memory or read-only memory (ROM). The ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage taking any suitable physical form. Storage 1606 may include one or more storage control units facilitating communication between processor 1602 and storage 1606, where appropriate. Where appropriate, storage 1606 may include one or more storage units 1606. Although this disclosure describes and illustrates particular storage, this disclosure contemplates any suitable storage.

In particular embodiments, I/O interface 1608 includes hardware, software, or both, providing one or more interfaces for communication between computer system 1600 and one or more I/O devices. Computer system 1600 may include or be communicably connected to one or more of these I/O devices, where appropriate. One or more of these I/O devices may enable communication between a person and computer system 1600. An input device may include devices for converting different forms of volitional user input into digital signals that can be processed by computer system 1600, for example and not by way of limitation, a keyboard, a keypad, microphone (e.g., to provide audio input), a camera (e.g., to provide gesture input or facial/body expression input), a mouse or trackball, stylus, touch screen, digital glove, hand-held 3D controller, head-mounted controller, optical motion-sensing systems (comprising infrared light projectors and detectors and/or cameras), non-optical (e.g., inertial, mechanical, magnetic, or stretch sensor-based) motion-capture systems, another suitable input device, or a combination of two or more of these. An input device may include one or more sensors for capturing different types of information. An output device may include devices designed to receive digital signals from computer system 1600 and convert them to some output format, for example and not by way of limitation, a paper or other 2D-media printer, 3D printer, speaker, headphones, projector, monitor, heads-up display, vehicle, drone, robot, another suitable output device, or a combination thereof. This disclosure contemplates any suitable I/O devices and any suitable I/O interfaces 1608 for them. Where appropriate, I/O interface 1608 may include one or more device or software drivers enabling processor 1602 to drive one or more of these I/O devices. I/O interface 1608 may include one or more I/O interfaces 1608, where appropriate. Although this disclosure describes and illustrates a particular I/O interface, this disclosure contemplates any suitable I/O interface.

In particular embodiments, communication interface 1610 includes hardware, software, or both providing one or more interfaces for communication (such as, for example, packet-based communication) between computer system 1600 and one or more other computer systems 1600 or one or more networks. Communication interface 1610 may include one or more interfaces to a controller area network (CAN) or to a local interconnect network (LIN). Communication interface 1610 may include one or more of a serial peripheral interface (SPI) or an isolated serial peripheral interface (isoSPI). In some embodiments, communication interface 1610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1610 for it. As an example and not by way of limitation, computer system 1600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1600 may include any suitable communication interface 1610 for any of these networks, where appropriate. Communication interface 1610 may include one or more communication interfaces 1610, where appropriate. Although this disclosure describes and illustrates a particular communication interface, this disclosure contemplates any suitable communication interface.

In particular embodiments, bus 1612 includes hardware, software, or both coupling components of computer system 1600 to each other. As an example and not by way of limitation, bus 1612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1612 may include one or more buses 1612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, solid-state drives (SSDs), RAM-drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

FIG. 16B illustrates example firmware 1650 for a vehicle ECU 1600 as described with respect to control system 1430. Firmware 1650 may include functions 1652 for analyzing sensor data based on signals received from sensors 1410 or cameras 1420 received through communication interface 1610. Firmware 1650 may include functions 1654 for processing user input (e.g., directly provided by a driver of or passenger in vehicle 1400, or provided through a computing device 1450) received through I/O interface 1608. Firmware 1650 may include functions 1656 for logging detected events (which may be stored in storage 1606 or uploaded to the cloud), as well as functions for reporting detected events (e.g., to a driver or passenger of the vehicle through an instrument display or interactive interface of the vehicle, or to a vehicle manufacturer, service provider, or third party through communication interface 1610). Firmware 1650 may include functions 1658 for assessing safety parameters (e.g., monitoring the temperature of a vehicle battery or the distance between vehicle 1400 and nearby vehicles). Firmware 1650 may include functions 1660 for transmitting control signals to components of vehicle 1400, including other vehicle ECUs 1600.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method of providing illumination for a vehicle, comprising:
sending, by one or more control modules of the vehicle, a signal to activate a headlamp assembly for the vehicle, the headlamp assembly comprising:
a laser-based lamp positioned to provide high-beam illumination, wherein the high-beam illumination includes a beam field of light comprising a plurality of beam subfields; and
a light sensor configured to capture images of illuminated objects, wherein the light sensor is capable of sensing objects illuminated by visible-spectrum light;
determining, by the one or more control modules and based on images captured by the light sensor, a focal region for the high-beam illumination; and
sending, by the one or more control modules, instructions to configure the laser-based lamp to modify a distribution of the high-beam illumination to increase a brightness of one or more beam subfields of the high-beam illumination within the focal region.

2. The method of claim 1, wherein the determining the focal region for the high-beam illumination further comprises:
identifying a curve in front of the vehicle; and
determining, based on the curve, the focal region for the high-beam illumination.

3. The method of claim 2, wherein the identifying the curve further comprises:
detecting, based on the images captured by the light sensor, road markings or road signs in front of the vehicle; and
determining the curve based on the road markings or road signs.

4. The method of claim 3, wherein the determining the curve further comprises:

determining, based on the road markings or road signs, a path of the curve, a radius of the curve, or a slope of the curve.

5. The method of claim 2, wherein the identifying the curve further comprises:
  detecting, based on the images captured by the light sensor, a road surface in front of the vehicle, wherein the road surface comprises:
    a constructed road surface; or
    a natural surface compacted by regular travel;
  determining, based on the road surface, a path of the curve.

6. The method of claim 1, wherein the determining the focal region for the high-beam illumination further comprises:
  detecting a user input for controlling vehicle movement;
  predicting, based on the user input, a trajectory of the vehicle; and
  determining, based on the predicted trajectory, the focal region for the high-beam illumination.

7. The method of claim 6, wherein the user input comprises a steering angle, and wherein the predicting the trajectory of the vehicle is further based on the steering angle.

8. The method of claim 6, wherein the user input comprises a turn signal activation, and wherein the predicting the trajectory of the vehicle further comprises:
  determining, based on the turn signal activation, an intended direction of travel, and wherein the predicting the trajectory of the vehicle is further based on the intended direction of travel.

9. The method of claim 6, wherein the user input comprises a throttle input or a brake input, and wherein the determining the focal region for the high-beam illumination is further based on the throttle input or the brake input.

10. The method of claim 1, wherein the determining the focal region for the high-beam illumination further comprises:
  detecting a kinetic state of the vehicle; and
  determining, based on the kinetic state of the vehicle, the focal region for the high-beam illumination.

11. The method of claim 10, wherein the kinetic state comprises a speed or acceleration of the vehicle, and wherein the determining the focal region for the high-beam illumination is based on the speed or acceleration of the vehicle.

12. The method of claim 1, wherein the determining the focal region for the high-beam illumination further comprises:
  detecting, based on the images captured by the light sensor, a road junction, wherein the road junction is two or more roadways or walkways intersecting; and
  determining, and based on the road junction, the focal region for the high-beam illumination, wherein the focal region comprises one or more corners of the road junction.

13. The method of claim 1, wherein the determining the focal region for the high-beam illumination further comprises:
  receiving information defining a route of travel;
  identifying an upcoming change in direction of the vehicle based on the route of travel; and
  determining, based on the upcoming change in direction, the focal region for the high-beam illumination.

14. The method of claim 1, wherein a total energy consumption of the laser-based lamp remains constant when the brightness of the one or more beam subfields of the high-beam illumination within the focal region increases.

15. The method of claim 1, wherein the instructions to configure the laser-based lamp to modify the distribution of the high-beam illumination further comprises instructions to decrease the brightness of the one or more beam subfields of the high-beam illumination within a non-focal region.

16. The method of claim 1, wherein a total energy consumption of the laser-based lamp decreases when the brightness of the one or more beam subfields of the high-beam illumination within a non-focal region decreases.

17. The method of claim 1, wherein the determining the focal region for the high-beam illumination is based on weather conditions.

18. The method of claim 1, wherein the determining the focal region for the high-beam illumination further comprises:
  detecting, based on the images captured by the light sensor, a pedestrian crossing; and
  determining, based on a non-vehicle lane, the focal region for the high-beam illumination, wherein the focal region comprises the pedestrian crossing.

19. A system including one or more computing devices, comprising:
  one or more non-transitory computer-readable storage media including instructions; and
  one or more processors coupled to the one or more storage media, the one or more processors configured to execute the instructions to:
    send, by one or more control modules of the vehicle, a signal to activate a headlamp assembly for a vehicle, the headlamp assembly comprising:
      a laser-based lamp positioned to provide high-beam illumination, wherein the high-beam illumination includes a beam field of light comprising a plurality of beam subfields; and
      a light sensor configured to capture images of illuminated objects, wherein the light sensor is capable of sensing objects illuminated by visible-spectrum light;
    determine, by the one or more control modules and based on images captured by the light sensor, a focal region for the high-beam illumination; and
    send, by the one or more control modules, instructions to configure the laser-based lamp to modify a distribution of the high-beam illumination to increase brightness of one or more beam subfields of the high-beam illumination within the focal region.

20. A non-transitory computer-readable medium comprising instructions that, when executed by one or more processors of one or more computing devices, cause the one or more processors to:
  send, by one or more control modules of the vehicle, a signal to activate a headlamp assembly for a vehicle, the headlamp assembly comprising:
    a laser-based lamp positioned to provide high-beam illumination, wherein the high-beam illumination includes a beam field of light comprising a plurality of beam subfields; and
    a light sensor configured to capture images of illuminated objects, wherein the light sensor is capable of sensing objects illuminated by visible-spectrum light;
  determine, by the one or more control modules and based on images captured by the light sensor, a focal region for the high-beam illumination; and send, by the one or more control modules, instructions to configure the laser-based lamp to modify a distribution of the high-beam illumination to increase brightness of one or more beam subfields of the high-beam illumination within the focal region.

* * * * *